United States Patent
Hiroi

(10) Patent No.: US 8,056,430 B2
(45) Date of Patent: Nov. 15, 2011

(54) TRANSMISSION CONTROLLER AND VEHICLE INCLUDING THE SAME

(75) Inventor: Kazutaka Hiroi, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1076 days.

(21) Appl. No.: 11/867,298

(22) Filed: Oct. 4, 2007

(65) Prior Publication Data

US 2008/0103663 A1    May 1, 2008

(30) Foreign Application Priority Data

Oct. 27, 2006  (JP) ................................ 2006-292897

(51) Int. Cl.
*F16H 59/68* (2006.01)
(52) U.S. Cl. ........................................................ 74/335
(58) Field of Classification Search ...................... 74/335
See application file for complete search history.

(56) References Cited

U.S. PATENT DOCUMENTS

2007/0026994 A1* 2/2007 Matsuda et al. ................. 477/92

FOREIGN PATENT DOCUMENTS

JP          2000-27991 A       1/2000

* cited by examiner

*Primary Examiner* — Edwin A Young
(74) *Attorney, Agent, or Firm* — Keating & Bennett, LLP

(57) ABSTRACT

A transmission controller includes a rotatable shaft that controls engagement and disengagement of a variable speed clutch. An actuator, such as an electric motor, drives the shaft. The shaft is rotated alternately in the normal and reverse directions by supplying a low level current to such an extent that a clutch transfer mechanism is not operated by the rotation. Rotation stop positions are detected. A play area between the rotation stop positions is calculated and can be used to correct for manufacturing inaccuracies or for wear occurring over time.

25 Claims, 20 Drawing Sheets

TRANSMISSION CONTROLLER AND VEHICLE INCLUDING THE SAME

CROSS-REFERENCE TO RELATED APPLICATIONS

This application claims the benefit of Japanese Patent Application No. JP 2006-292897, filed on Oct. 27, 2006, the disclosure of which is incorporated herein by reference in its entirety.

BACKGROUND OF THE INVENTION

1. Field of the Invention

The present invention generally relates to a transmission controller that drives an actuator, such as a motor, to cause engagement and disengagement of a clutch and to cause a speed change of a transmission. The present invention also generally relates to a vehicle including such a transmission controller.

2. Description of the Related Art

A transmission controller can be used to control a motor that drives a shift shaft. Rotation of the shift shaft can be used to control engagement and disengagement of a clutch and to control change of gear ratios with varied gear combinations. See JP-A-2000-27991. This type of transmission controller has a clutch transfer mechanism located between the shift shaft and the clutch. The clutch transfer mechanism causes engagement and disengagement of the clutch in accordance with the rotation of the shift shaft. The transmission controller also has a transmission transfer mechanism located between the shift shaft and the transmission. The transmission transfer mechanism switches the selected gear ratio in accordance with the rotation of the shift shaft.

JP-A-2000-27991 discloses a method for correcting a neutral position of the shift shaft. According to this correcting method, the shift shaft is rotated to its limits in both directions of rotation and the respective rotation angle positions are detected at the limits. The midpoint between the limit rotation angles then is registered as the new neutral position of the shift shaft.

SUMMARY OF THE INVENTION

However, the following problems arise from the method for correcting the neutral position shown in JP-A-2000-27991. In the process of manufacturing a number of vehicles, mechanical rotation limits of the shift shaft in its forward rotation and reverse rotation are different for each vehicle due to design limitations, tolerance stacking or assembly of components, among other reasons. Thus, when the neutral position is calculated from the rotation angle positions detected as above in a vehicle having the rotation limit of the normal rotation different from the rotation limit of the reverse rotation, the calculated neutral position does not correspond to the actual neutral position. In this case, when the improperly calculated neutral position is established as a reference, accurate shift change is not likely to be attained.

Even when the neutral position of the shift shaft is slightly deviated, accurate detection of the neutral position of the shift shaft is not always required in a structure which has a region of play (for example, a play area of shift shaft, a play area of link mechanism (rotatable arm, rod, ball joint etc.) closer to the clutch transfer mechanism than the detection area detected by a sensor of the actuator, and a play area of clutch transfer mechanism), that is, a region where the shift shaft idles during the period from rotation start of the shift shaft until operation start of the clutch transfer mechanism. While the shift shaft is idling within this play area, the clutch transfer mechanism is not operated. However, the play area is likely to vary from vehicle to vehicle even within the same model of vehicle. In addition, the play area changes by long-term use of the vehicle.

When the play area of the shift shaft varies, the rotational position of the shift shaft at the time of half-clutch (half-clutch position) and the rotational position of the shift shaft at the time of disengagement of the clutch (clutch disengagement position) shift accordingly. It is therefore possible to accurately detect the half-clutch position and clutch disengagement position by accurately detecting the play area, allowing a more accurate shift change to be achieved.

When an operator of a vehicle that has a shift pedal executes a shift change by using a foot, an abnormal condition of the clutch or the like due to degradation over time or other cause can be detected based on experience and the feeling generated at the shift pedal. However, when an actuator is used to cause a shift change, such an abnormal condition cannot be detected through the senses of the operator.

Thus, an actuator-based system is desired in which a transmission controller is provided to provide more accurate shift changes.

In one configuration, a transmission controller comprises an actuator adapted to generate a driving force. A shift shaft is drivingly coupled to the actuator. The shift shaft is rotatable in a normal direction and a reverse direction. A clutch transfer mechanism is connected to the shift shaft. The clutch transfer mechanism is coupled to a clutch. The clutch transfer mechanism is adapted to engage and disengage the clutch in accordance with rotation of the shift shaft. A transmission transfer mechanism also is connected to the shift shaft. The transmission transfer mechanism is adapted to change a transmission gear ratio in accordance with rotation of the shift shaft. A play area measurement system is adapted to measure a play area of the shift shaft in which rotation of the shift shaft does not result in actuation of the clutch transfer mechanism.

BRIEF DESCRIPTION OF THE DRAWINGS

These and other features, aspects and advantages of the present invention will now be described with reference to the drawings of a preferred embodiment, which embodiment is intended to illustrate and not to limit the invention.

DETAILED DESCRIPTION OF THE PREFERRED EMBODIMENTS

Figure 1:
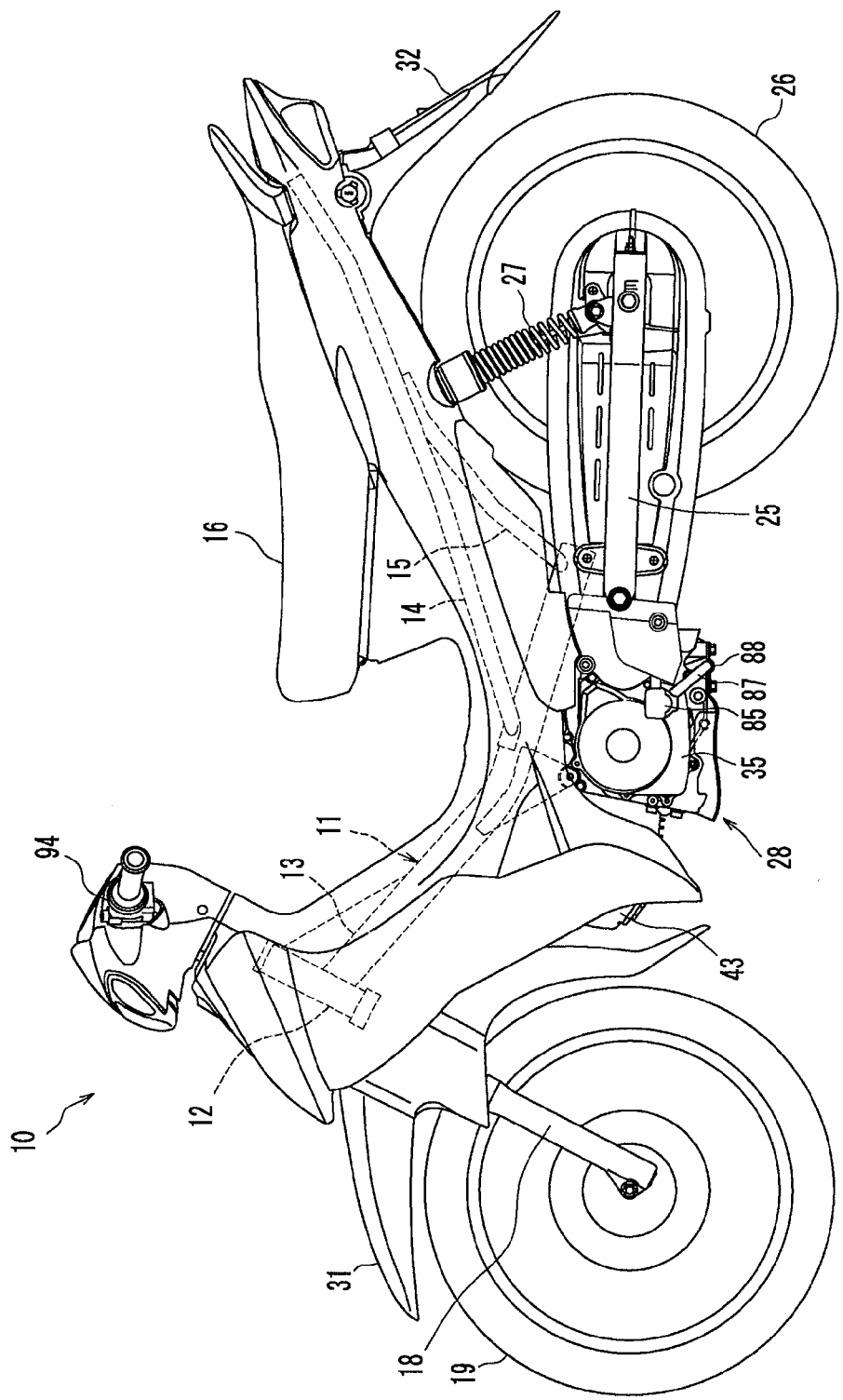
FIG. 1 is a left side view of a motorcycle that is arranged and configured in accordance with certain features, aspects and advantages of a preferred embodiment.

With reference initially to FIG. 1, the illustrated straddle type vehicle is a motorcycle 10. Other straddle type vehicles also can benefit from certain features, aspects and advantages of the present invention. As used herein, a straddle type vehicle generally refers to a vehicle in which the legs of a rider are position to lateral sides of a seat or other seating area. The motorcycle 10 can be a so-called moped-type or scooter-type of motorcycle. However, these are but two examples of the type of vehicles that can benefit from certain features, aspect and advantages of the present invention. Thus, by illustrating a moped-type or scooter-type of motorcycle, the maximum speed, displacement amount or the like of the vehicle is not meant to be restrict nor is the size or the like of the vehicle meant to be restricted. Thus, the motorcycle can be of the type having a fuel tank placed in front of a seat and the straddle type vehicle can be a type of vehicle other than the illustrated motorcycle, such as an all terrain vehicle or a motor tricycle, for example but without limitation.

The illustrated motorcycle 10 comprises a vehicle frame 11. The frame 11 preferably supports a seat 16 on which a rider sits. In the following descriptions, the fore to aft and lateral directions mean directions that the rider sitting on the seat 16 perceives. The vehicle frame 11 comprises a steering head pipe 12, a single main frame 13 extending obliquely downward and rearward from the steering head pipe 12, a pair of right and left seat rails 14 extending obliquely upward and rearward from a mid portion of the main frame 13, and a pair of right and left back stays 15 extending obliquely upward and rearward from the main frame 13 in the rear of the seat rails 14. The back stays 15 are connected to a rear portion of the main frame 13 and to mid portions of the respective seat rails 14. The steering head pipe 12 supports a front wheel 19 via a front fork 18.

A rear arm 25 is supported by the lower rear region of the vehicle body such that the rear arm 25 can freely swing. A rear wheel 26 is supported by the rear end of the rear arm 25. The rear half of the rear arm 25 is suspended from the body frame 11 via a cushion unit 27.

The illustrated motorcycle 10 comprises a front fender 31 covering the upper part and the rear part of the front wheel 19 and a rear fender 32 covering the obliquely rear upper part of the rear wheel 26.

The vehicle frame 11 supports an engine unit 28 that drives the rear wheel 26. The engine unit 28 comprises a crankcase 35 and a cylinder 43 that extends forward or obliquely upward and forward from the crankcase 35. Footrests 85 are disposed on the right and left sides of the engine unit 28. The crankcase 35 supports the right and left footrests 85 via a coupling bar 87 and an attaching plate 88 that is fixed to the coupling bar 87.

Next, with reference primarily to FIG. 2 and FIG. 3, a structure of the engine unit 28 will be described. The engine unit 28 comprises an engine 29. The engine 29 comprises a crankshaft 30, a centrifugal clutch 36, a variable speed clutch 37 that is disengaged and engaged when a gear ratio change occurs, and a transmission 38. Although the engine 29 can have any suitable configuration, the illustrated engine 29 comprises a four-stroke, single cylinder engine. The engine 29 is not limited to an internal combustion engine such as, for example, the gasoline engine used in this embodiment and can be an electric motor or the like. Further, in some configurations, the engine can be a combination of the gasoline engine and the electric motor.

Figure 3:
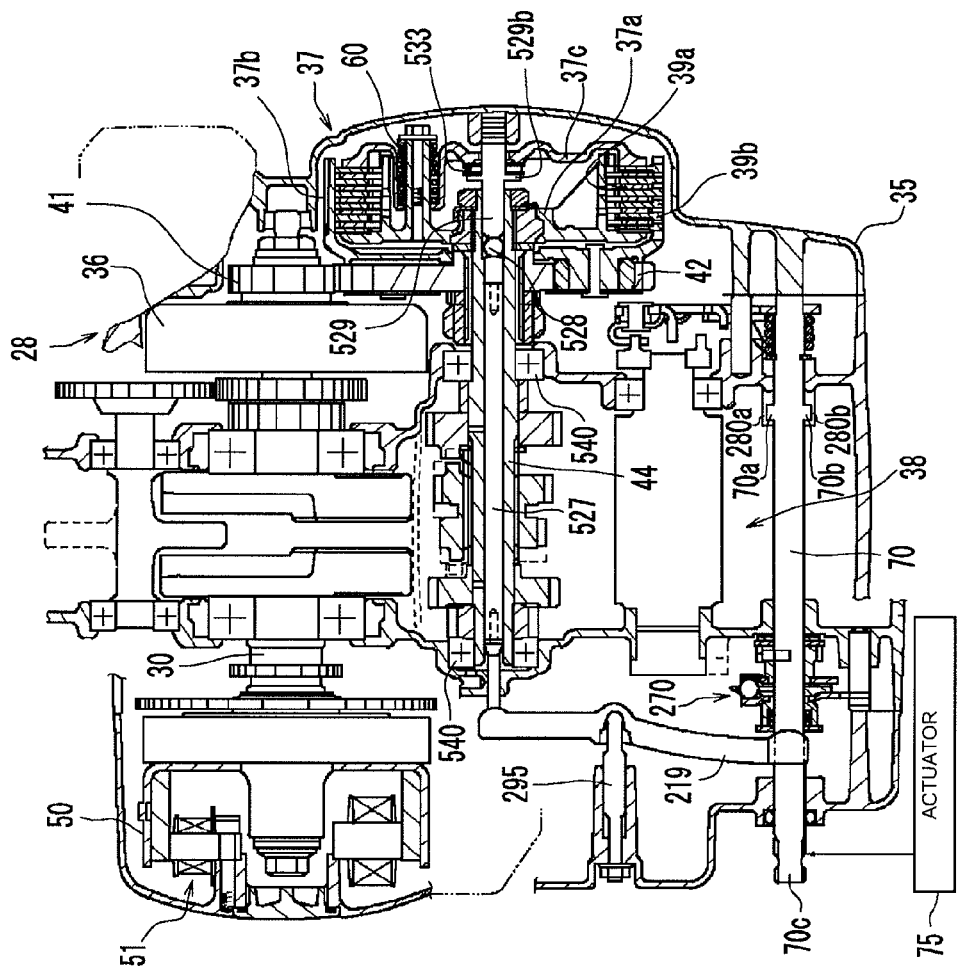
FIG. 3 is a cross-sectional view of the engine unit of FIG. 2.

As shown in FIG. 3, the centrifugal clutch 36 can be mounted to a right end portion of the crankshaft 30. Although not shown, the centrifugal clutch 36 comprises a clutch boss fixed to the crankshaft 30 and a clutch housing. The centrifugal clutch 36 is disengaged while the engine is idling and is engaged when the motorcycle is moving. That is, the centrifugal clutch 36 is disengaged if a rotational speed of the crankshaft 30 (i.e., the engine speed) is less than a predetermined speed and is engaged if the rotational speed exceeds the predetermined speed.

The variable speed clutch 37 preferably comprises a wet type, multiple plate clutch and comprises a clutch boss 37a and a clutch housing 37b. However, the variable speed clutch 37 is not limited to any particular type. The centrifugal clutch 36 comprises a gear 41 and the clutch housing 37b of the variable speed clutch 37 also comprises a gear 42. These gears 41, 42 mesh with each other. Accordingly, the clutch housing 37b of the variable speed clutch 37 rotates with the centrifugal clutch 36, or more specifically the illustrated clutch housing of the variable speed clutch 37 rotates with the clutch housing of the centrifugal clutch 36.

The illustrated clutch boss 37a is mounted to a main shaft 44 and rotates with the main shaft 44. The clutch housing 37b is mounted to the main shaft 44 for rotation about the main shaft 44. The clutch boss 37a comprises a plurality of friction plates 39a while the clutch housing 37b comprises a corresponding plurality of clutch plates 39b. Each friction plate 39a is interposed between respective clutch plates 39b, 39b that neighbor each other.

A pressure plate 37c is disposed on the right side of the illustrated clutch boss 37a. The pressure plate 37c is axially moveable and is urged leftward in FIG. 3 by a compression spring 60. That is, the pressure plate 37c is urged in a direction in which the pressure plate 37c compresses the friction plates 39a and the clutch plates 39b together. When the pressure plate 37c moves rightward against the urging force of the compression spring 60, the friction plates 37c and the clutch plates 39b separate from each other. The variable speed clutch 37 is thus disengaged.

Figure 2:
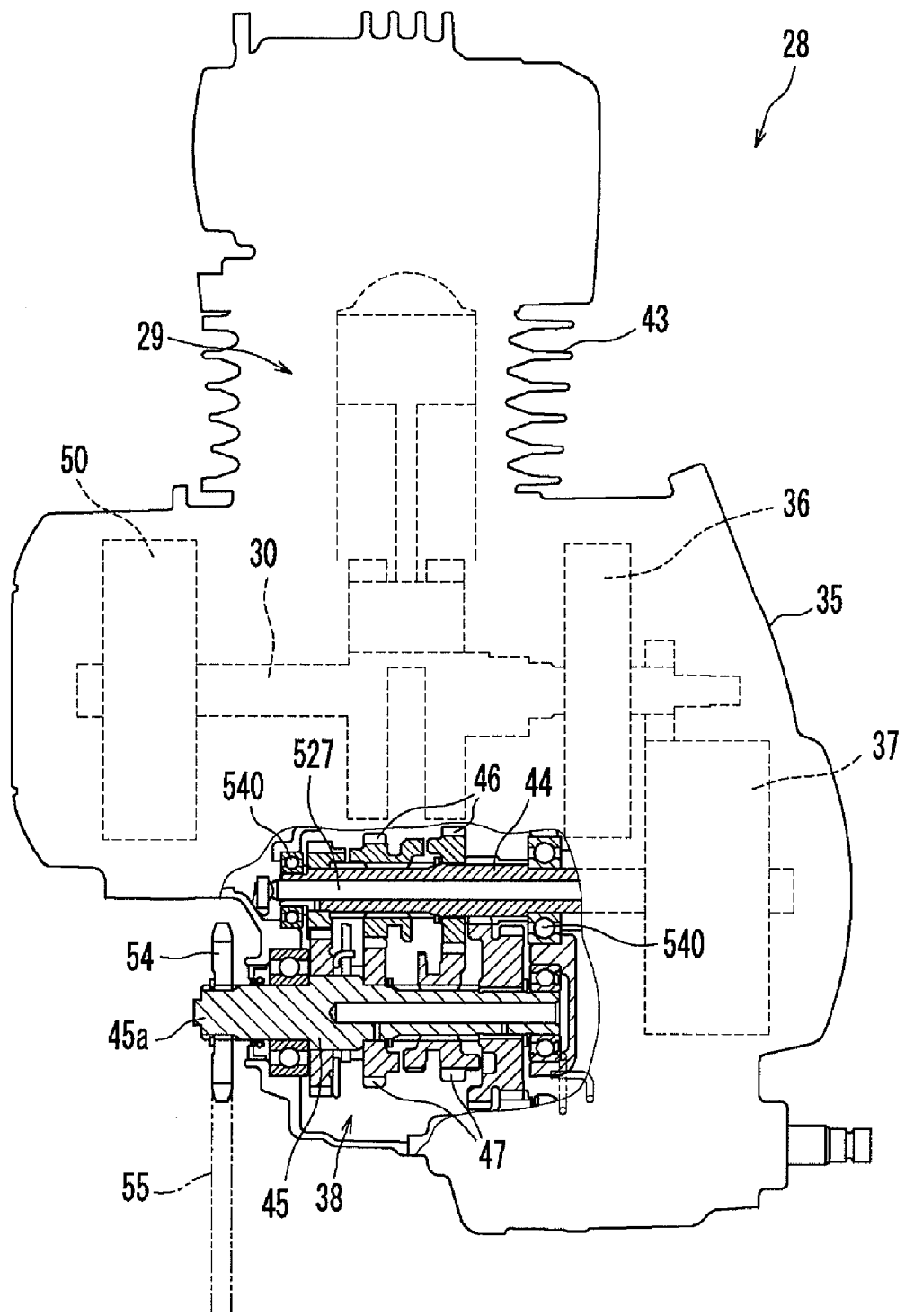
FIG. 2 is a partially cut away cross-sectional view of an engine unit used in the motorcycle of FIG. 1.

As shown in FIG. 2, a plurality of shiftable gears 46 are arranged circumferentially around the main shaft 44. A plurality of corresponding shiftable gears 47 are mounted to a drive shaft 45 that extends generally parallel to the main shaft 44. The shiftable gears 46 on the main shaft 44 and the shiftable gears 47 on the drive shaft 45 mesh with each other. Either the shiftable gears 46 or the shiftable gears 47, or both of them are mounted to idle relative to the main shaft 44 or the drive shaft 45, except the gears that are selected. Accordingly, driving force is transmitted from the main shaft 44 to the drive shaft 45 through any selected pair of the shiftable gears.

Figure 4:
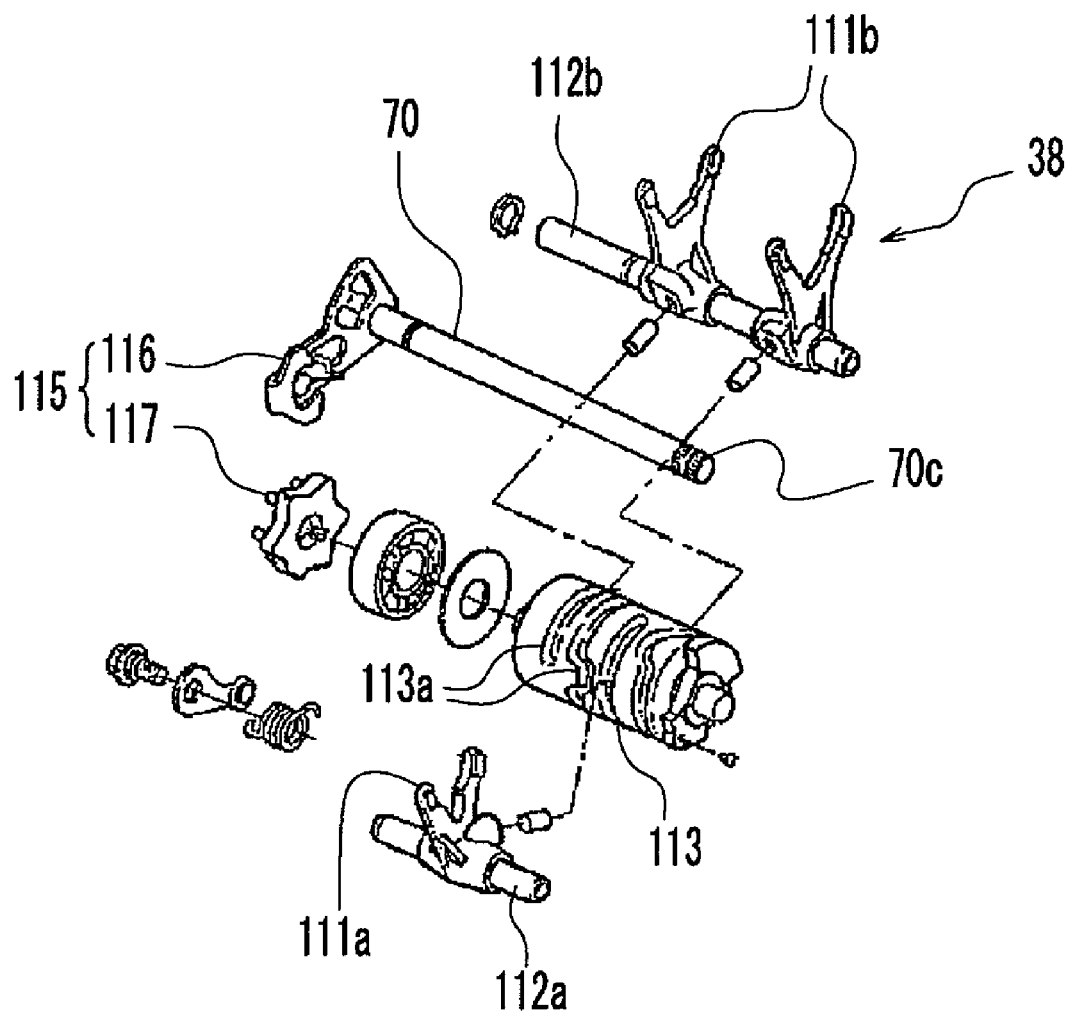
FIG. 4 is a perspective view illustrating a part of a disassembled transmission used in the engine unit of FIG. 2.

The shiftable gears are selected via a shift cam 113 (see FIG. 4). As shown in FIG. 4, the gear shifter 38 includes a shift fork 111*a* that slides the shiftable gears 46 in the axial direction of the main shaft 44 and a slide rod 112*a* that supports the shift fork 111*a* for sliding movement. Also, the transmission 38 includes a shift fork 111*b* that slides the shiftable gears 47 in the axial direction of the drive shaft 45 and a slide rod 112*b* that supports the shift fork 111*b* for slide movement. Cam grooves 113*a* are circumferentially formed around the shift cam 113. The shift forks 111*a*, 111*b* slide along the cam grooves 113*a*.

The shift cam 113 rotates with the rotation of the shift shaft 70 through a ratchet mechanism 115. The ratchet mechanism 115 is an example of a transmission transfer mechanism and can comprise a mechanism that rotates the shift cam 113 at fixed intervals (angles) to regularly move the shift forks 111*a*, 111*b*. The ratchet mechanism 115 thus has ratchet functions effective in both forward and reverse directions to shift stages one at a time for changing gear ratios. A shift arm 116 of the ratchet mechanism 115 transmits the rotation of the shift shaft 70 and simultaneously restricts a stroke of the shift shaft 70 to prevent an overrun of the shift cam 113. The stopper plate 117 of the ratchet mechanism 115 fixes the shift cam 113 to a predetermined position.

Figure 5:
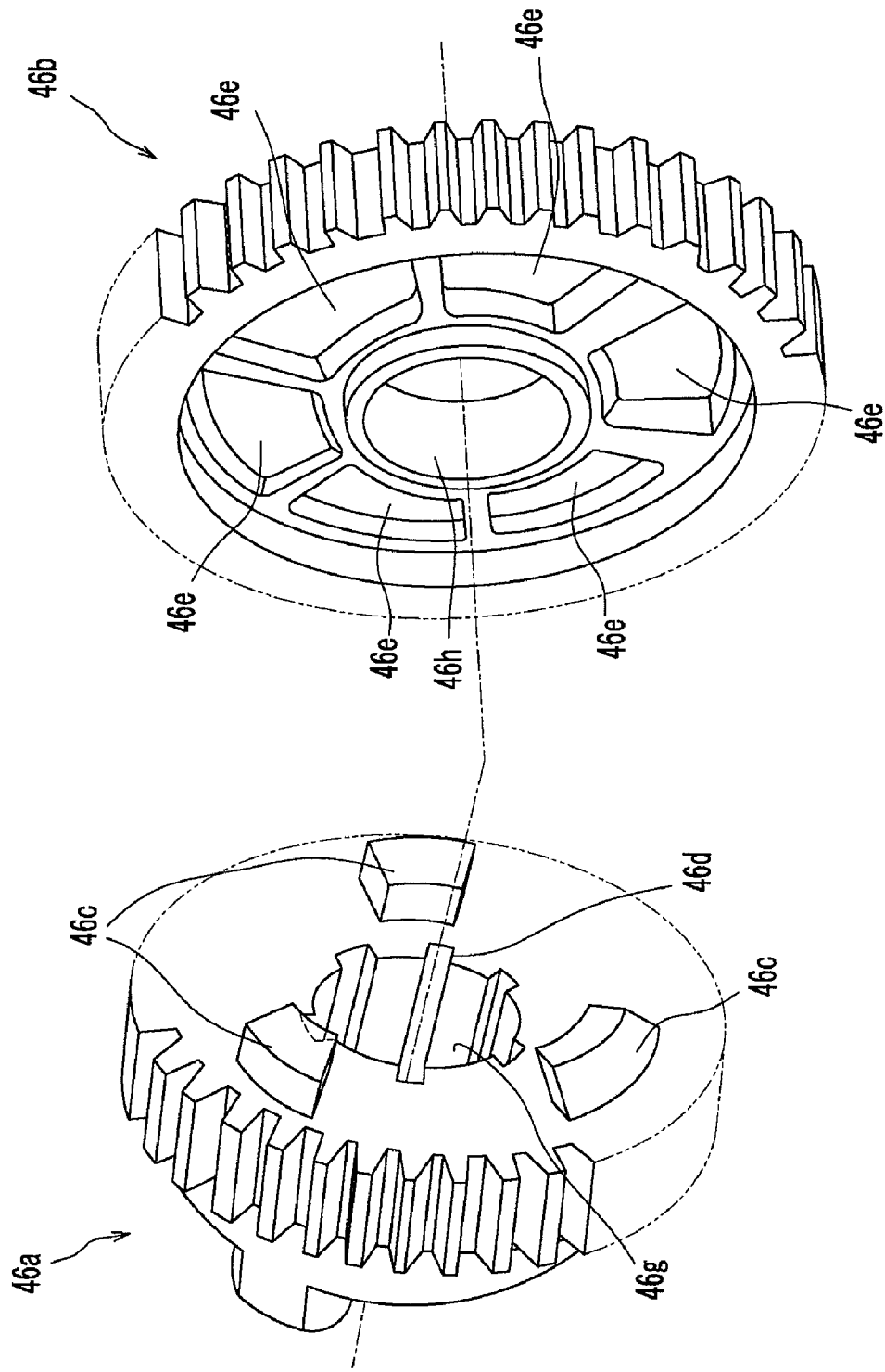
FIG. 5 is a perspective view of a variable speed gear used in the transmission of FIG. 4.

The transmission 38 preferably is a dog clutch transmission. As illustrated in FIG. 5, the variable speed gear 46 can comprise a first gear 46*a* having engaging projections 46*c* on the shaft end surface, and a second gear 46*b* having engaging concaves 46*e* on the shaft end surface opposed to the engaging projections 46*c*. The transmission 38 preferably has plural first gears 46*a* and second gears 46*b*. The variable speed gear 47 (see FIG. 2) has a structure similar to that of the variable speed gear 46. The illustrated first gear 46*a* has three engaging projections 46*c*. The engaging projections 46*c* are disposed on the outer periphery of the shaft end surface of the first gear 46*a* at generally uniform intervals in the circumferential direction. The second gear 46*b* has six engaging cavities or recesses 46*e* that are disposed at generally uniform intervals in the circumferential direction so as to be similar in structure to the engaging projections 46*c* of the first gear 46*a*.

An insertion hole 46*g* through which the main shaft 44 and the drive shaft 45 are inserted is formed at the axial center of the first gear 46*a* and a plurality of grooves 46*d* are provided on the circumferential surface of the insertion hole 46*g*. As illustrated in FIG. 2, the main shaft 44 is inserted through the variable speed gear 46, and the drive shaft 45 is inserted through the variable speed gear 47. The first gear 46*a* engages with the main shaft 44 and the drive shaft 45 by splines. The second gear 46*b* has an insertion hole 46*h* through which the main shaft 44 and the drive shaft 45 are inserted, but the insertion hole 46*h* has no groove. Thus, the second gear 46*b* is attached to the main shaft 44 and the drive shaft 45 such that the second gear 46*b* idles relative to the shafts 44, 45.

In accordance with rotation of the shift cam 113 (see FIG. 4), the shift fork 111*a* shifts along the cam grooves 113*a*, thereby the first gear 46*a* moves in the axial direction along the splines of the main shaft 44 and the drive shaft 45. By engagement between the engaging projections 46*c* of the first gear 46*a* with the engaging recesses 46*e* of the second gear 46*b*, the combination of the variable speed gears 46, 47 that transmit the driving force from the main shaft 44 to the drive shaft 45 can be switched, and gear ratio change is thus achieved.

As shown in FIG. 3, a bearing 540 supports the main shaft 44, which preferably is hollow, for rotation. A first push rod 527, a ball 528 and a second push rod 529 are movably inserted into the hollow of the main shaft 44, and their axial movement shifts the pressure plate 37*c* in a lateral direction. The second push rod 529 has a flange 529*b*. A bearing 533 is interposed between the flange 529*b* and the pressure plate 37*c*. Thus, the pressure plate 37*c* is rotatable, although the second push rod 529 is not rotatable.

Figure 6:
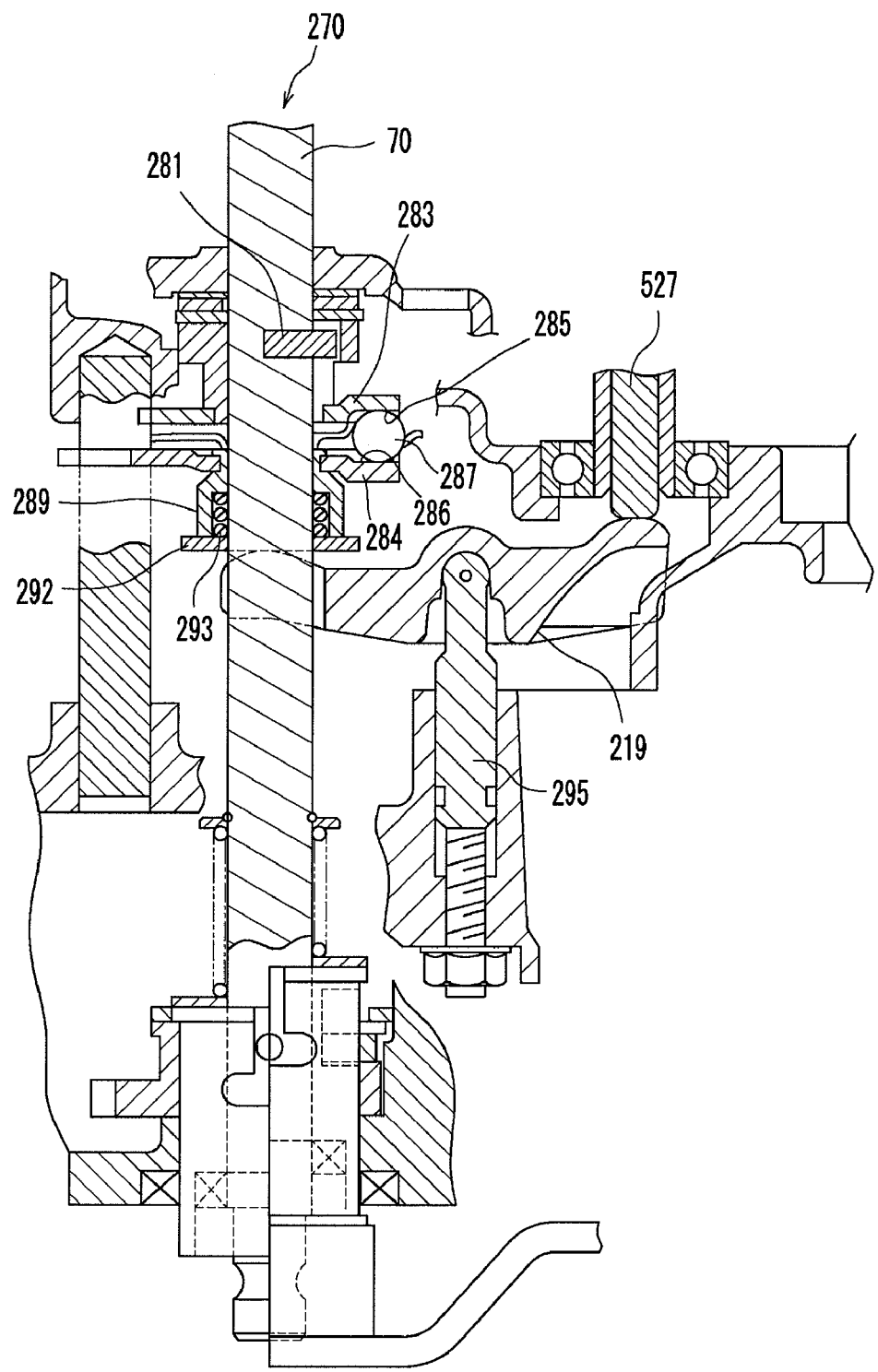
FIG. 6 is an enlarged cross-sectional view of a clutch transfer mechanism used in the engine unit of FIG. 2.

A clutch transfer mechanism 270 converts the rotation of the shift shaft 70 to a reciprocal movement of the first push rod 527. FIG. 6 is an enlarged cross sectional view of the clutch transfer mechanism 270 shown in FIG. 3. The clutch transfer mechanism 270 shown in FIG. 6 is a ball type cam mechanism that converts the rotation of the shift shaft 70 into the desired reciprocal movement.

The clutch transfer mechanism 270 comprises a first cam plate 283 that rotates together with the shift shaft 70 and a second cam plate 284 that opposes the first cam plate 283. The first cam plate 283 is fixed to the shift shaft 70 with a coupling pin 281. Respective opposing surfaces of the first cam plate 283 and the second cam plate 284 comprise a first cam groove 285 and a second cam groove 286.

The illustrated clutch transfer mechanism 270 comprises three balls 287 (FIG. 6 shows only one of them) that are interposed between the first cam plate 283 and the second cam plate 284. Those balls 287 engagingly fit in the first cam groove 285 and the second cam groove 286. Each of the first and second cam plates 283, 284 has a disk-like shape. Preferably, the three balls 287 are arranged in the circumferential direction.

The second cam plate 284 is fixed to a boss 289, which is movable in the axial direction of the shift shaft 70. A press plate 292 contacts with a bottom end of the boss 289. The press plate 292 touches a pressure lever 219 described later. A compression coil spring 293 is interposed between the press plate 292 and the boss 289.

A left end portion of the pressure lever 219 touches the pressure plate 292. A right end portion of the pressure lever 219 touches the first push rod 527 (see FIG. 3 as well). A support shaft 295 supports a central portion of the pressure lever 219 in its longitudinal direction. The pressure lever 219 is pivotable about a contact point of the support shaft 295 which functions as a fulcrum.

When the shift shaft 70 rotates with the rotation of the actuator 75 (see FIG. 3), the first cam plate 283 also rotates together with the rotation of the shift shaft 70. Because the second cam plate 284 does not rotate together with the shift shaft 70, the first cam plate 283 rotates relative to the second cam plate 284. As a result of the relative motion between the plates 283, 284, the ball 287 moves circumferentially in the cam groove 286 of the second cam plate 284 while being held in the cam groove 285 of the first cam plate 286. When the shift shaft 70 further rotates, the ball 287 surmounts the cam groove 286 and comes out from the cam groove 286. Because the ball 287 comes out from the cam groove 286, the second cam plate 284 is moved away from the first cam plate 283 by the ball 287 in the axial direction of the shift shaft 70. Because of the movement of the second cam plate 284, the press plate 292 presses the left end portion of the pressure lever 219 (downward in FIG. 6).

When the press plate 292 presses the left end portion of the pressure lever 219, the pressure lever 219 pivots about the contact point of the support shaft 295, which functions as the fulcrum. Thus, the right end portion of the pressure lever 219 presses the first push rod 527 (upward in FIG. 6). Because the pressure lever 219 presses the first push rod 527, the first push rod 527, as shown in FIG. 3, slides rightward. The first push rod 52 thus presses the second push rod 529 with the ball 528. Thus, the second push rod 529 slides rightward in FIG. 3.

As shown in FIG. 3, the axial movement of the second push rod 529 moves the pressure plates 37c rightward against the urging force of the compression spring 60. As a result, the compressive contact state of the friction plates 39a and the clutch plates 39b is released and the gearshift clutch 37 is disengaged.

As discussed above, the shift shaft 70 and the pressure plate 37c are coupled together by the pressure lever 219, the first push rod 527, the ball 528 and the second push rod 529. The pressure plate 37c thus moves in accordance with the rotation of the shift shaft 70. That is, upon the start of the rotation of the shift shaft 70, the pressure plate 37c moves rightward. When a rotational angle of the shift shaft 70 reaches a preset angle (clutch disengagement start angle), the variable speed clutch 37 is disengaged. When the shift shaft 70 further rotates and its angle reaches another preset angle (shift start angle), the shift cam 113 rotates (see FIG. 4) to cause a gearshift operation.

Figure 7:
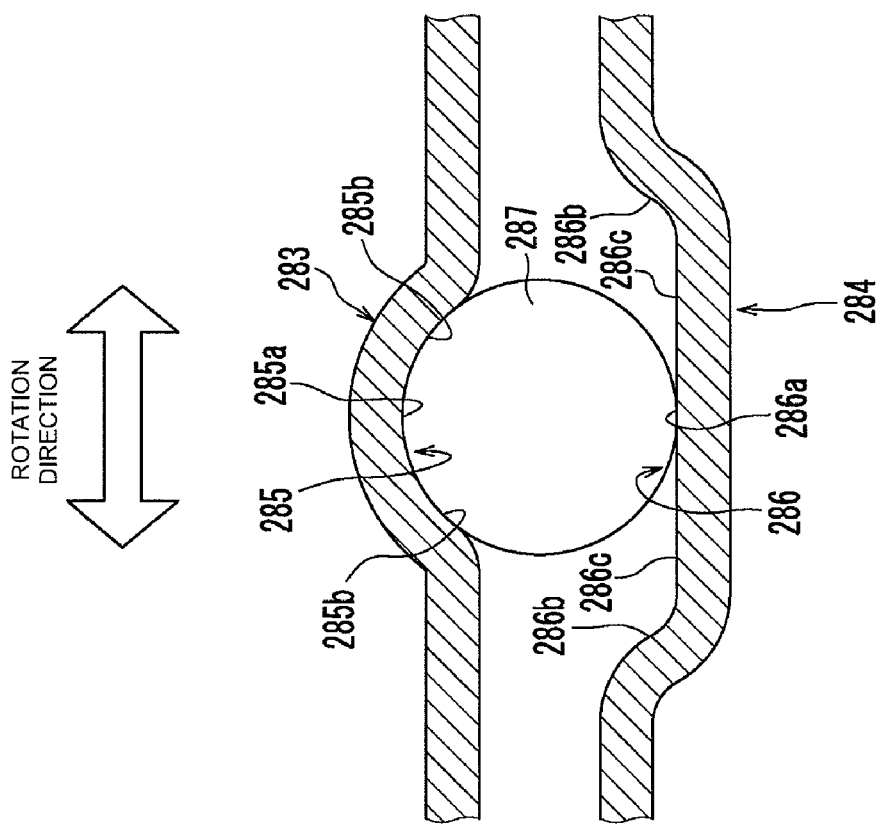
FIG. 7 is an enlarged cross-sectional view of cam plate and ball of the clutch transfer mechanism of FIG. 6.

FIG. 7 is an enlarged cross-sectional view illustrating the ball 287 sandwiched between the first cam plate 283 and the second cam plate 284. The first cam groove 285 formed on the first cam plate 283 has a shape generally corresponding to the outer circumference of the ball 287. The first cam groove 285 has a groove bottom 285a and inclined portions 285b located on both sides of the groove bottom 285a. The second cam groove 286 formed on the second cam plate 284 has extensions 286c producing a larger length of the second cam groove 286 than the length of the first cam groove 285 in the rotation direction (shown by an arrow in the figure). The extensions 286c are formed on both sides of a groove bottom 286a. Inclined portions 286b are provided adjacent to the extensions 286c. The groove bottom 286a and the extensions 286c on both sides of the groove bottom 286a form a continuous smooth surface.

As illustrated in FIG. 7, it is assumed that the shift shaft 70 starts rotation when the ball 287 is positioned substantially at the center of the second cam groove 286. With initiation of rotation of the shift shaft 70, the first cam plate 283 starts rotating relative to the second cam plate 284. While the ball 287 is positioned on the extensions 286c, the distance between the first cam plate 283 and the second cam plate 284 generally does not change. In this condition, the clutch transfer mechanism 270 (see FIG. 6) is not operated and the shift shaft 70 thus idles.

When the ball 287 reaches the inclined portions 286b of the cam groove 286, it rides on the inclined portions 286b. After the ball 287 shifts along the inclined portions 286b in this manner, the second cam plate 284 separates from the first cam plate 283. As a result, the distance between the first cam plate 283 and the second cam plate 284 increases. In this condition, the clutch transfer mechanism 270 (see FIG. 6) is operated by the shift shaft 70.

Thus, the range of rotational positions of the shift shaft 70 corresponding to the movements of the ball 287 on the extensions 286c (e.g., the range of rotation corresponding to idle rotation of shift shaft 70) can correspond to the play area. While the extensions 286c are formed on the second cam plate 284 in this embodiment, the extensions can be provided on the first cam plate 283 or on both the first cam plate 283 and the second cam plate 284.

As illustrated in FIG. 3, the shift shaft 70 has contacting portions 70a, 70b projecting from the outer surface of the shift shaft 70 in the radial direction. The crank case 35 has stoppers 280a, 280b contacting the contacting portions 70a, 70b. The stoppers 280a, 280b regulate the rotation of the shift shaft 70. More specifically, at the time of rotation of the shift shaft 70 in the up-shift direction (hereinafter, rotation in up-shift direction is referred to as reverse rotation), the stopper 280a contacts the contacting portion 70a to regulate the rotation of the shift shaft 70. On the contrary, at the time of rotation of the shift shaft 70 in the down-shift direction (hereinafter, rotation in down-shift direction is referred to as normal rotation), the stopper 280b contacts the contacting portion 70b to regulate the rotation of the shift shaft 70.

The stoppers are not limited to the stoppers 280a, 280b shown in FIG. 3, but can be various other types of stoppers which can regulate the rotation of the shift shaft 70. The rotation angle of the shift shaft 70 whose rotation is regulated by the stoppers 280a, 280b corresponds to a so-called mechanical maximum rotation angle.

As shown in FIG. 3, a flywheel magneto 50 is mounted to a left end portion of the crankshaft 30. The flywheel magneto 50 forms a rotor of a generator 51.

A portion of the illustrated shift shaft 70 protrudes outside the crankcase 35 and forms a protruding section 70a. As shown in FIG. 2, a portion of the drive shaft 45 also protrudes outside the crankcase 35. A sprocket 54 is fixed to a protruding section 45a of the drive shaft 45. A chain 55 is wound around the drive shaft sprocket 54 and a sprocket (not shown) of the rear wheel 26.

Figure 8:
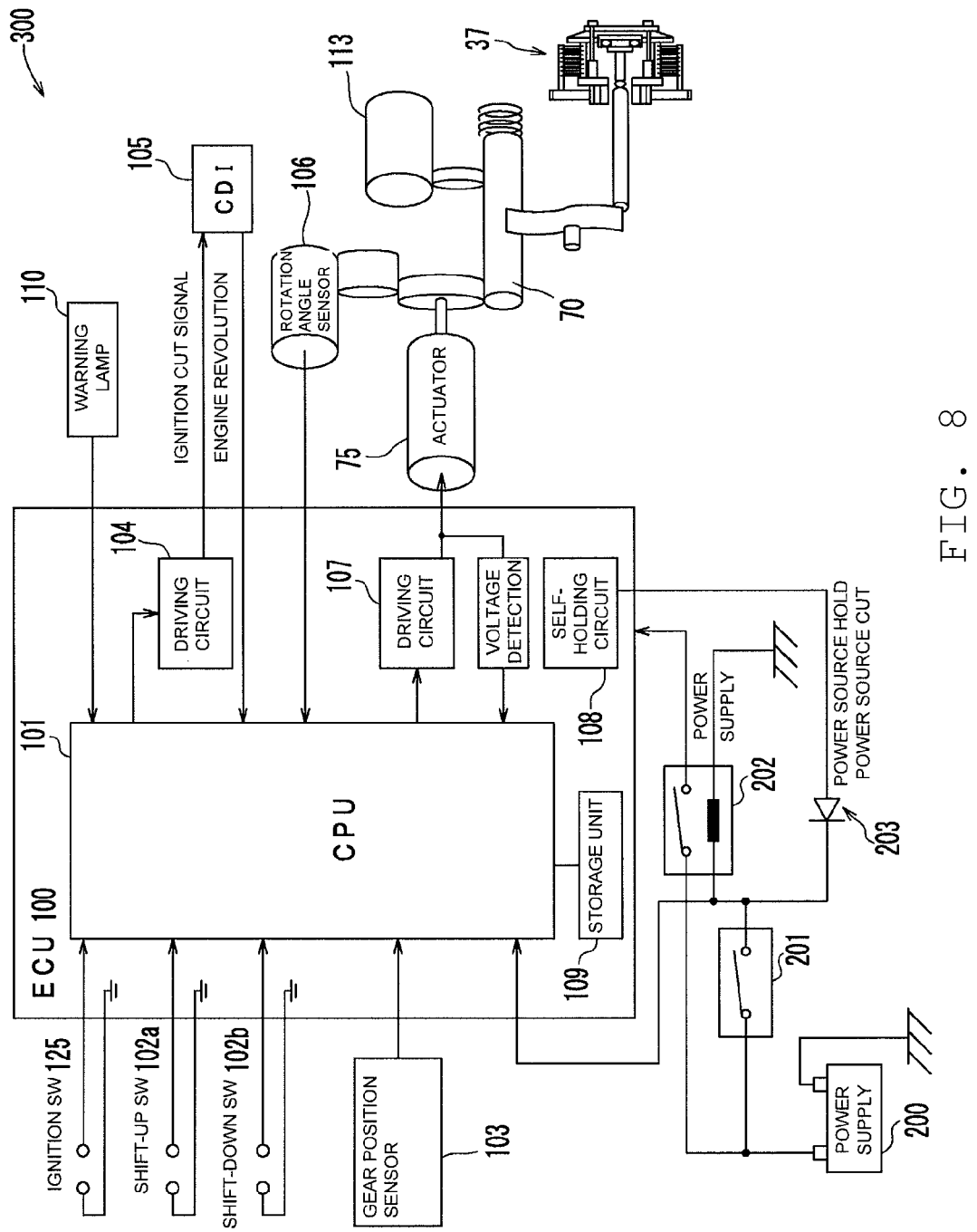
FIG. 8 is a block diagram schematically showing a control system.

FIG. 8 is a block diagram schematically showing the structure of a control system mounted on the motorcycle 10. An up-shift switch 102a and a down-shift switch 102b are connected to a CPU 101 included in an ECU (engine control unit) 100. The up-shift switch 102a and the down-shift switch 102b are disposed on a left handlebar 94 (see FIG. 1) of the motorcycle 10 as switches to be operated at the time of shift change (up shift and down shift). An ignition switch 125 is also connected to the CPU 101. The ignition switch 125 is turned on to start the engine 29.

A gear position sensor 103 is connected to the CPU 101. The gear position sensor 103 preferably is a sensor that detects gear positions (e.g., by detecting rotational positions of the shift cam 113). The CPU 101 obtains the gear positions based upon the rotational positions of the shift cam 113 (see FIG. 4) detected by the gear position sensor 103.

A capacitive discharge ignition (CDI) unit 105 is connected to the CPU 101 through a drive circuit 104. As shown in FIG. 2, the CDI unit 105 cuts some ignitions of the engine 29 based upon ignition cut signals supplied from the CPU 101 through the drive circuit 104 to reduce the driving power of the engine 29. Also, the CDI unit 105 detects rotational speeds of the engine 29 (engine speeds) and supplies the engine speed to the CPU 101. Thus, the CDI unit 105 can function as the engine speed detecting device. Additionally, the engine speed detecting device can either directly or indirectly detect rotational speeds of the crankshaft 30 of the engine 29. Other suitable techniques and devices can be used to detect the engine speed.

The actuator 75 is connected to the CPU 101 through a drive circuit 107. The actuator 75 preferably comprises an electric motor, which is not shown. The drive circuit 107 controls operations (e.g., through pulse width modulation (PWM) control) of the motor of the actuator 75 based upon control signals sent from the CPU 101.

A rotational angle sensor 106 is connected to the CPU 101. The rotational angle sensor 106 detects rotational positions of the shift shaft 70. The rotational angle sensor 106 can directly detect the rotational positions of the shift shaft 70 or can indirectly detect them.

The ECU 100 comprises a storage unit 109. The storage unit 109 can be of any suitable type, such as ROM or the like.

A warning lamp 110 is connected with the CPU 101. The warning lamp 110 lights (or blinks) during play area measurement which will be described later, in such a case where a predetermined abnormality of the motorcycle 10 has been detected, or on other occasions.

The motorcycle 10 has a power supply 200, a main switch 201, a main relay 202, and a power supply hold and power supply cutoff circuit 203.

The power supply 200 supplies source power to the ECU 100 via the main switch 201 and the main relay 202, and supplies holding voltage to a self-holding circuit 108 included in the ECU 100 via the power supply hold and power supply cutoff circuit 203.

The main switch 201 is a switch to be operated by the rider at the start of the motorcycle 10. When the main switch 201 is turned on by switch operation of the driver, source voltage is supplied from the power supply 200 to the main relay 202 and the power supply hold and power supply cutoff circuit 203. The main switch 201 also outputs a main SW signal indicating OF/OFF condition to the ECU 100.

The main relay 202 comprises an exciting coil and a contact. When source voltage is supplied to the exciting coil via the main switch 201, the main relay 202 brings the contact into the ON condition and supplies the source voltage to the ECU 100.

The power supply hold and power supply cutoff circuit 203 comprises a voltage regulation diode or the like. When the source voltage supplied via the main switch 201 is higher than a predetermined voltage, the power supply hold and power supply cutoff circuit 203 supplies holding voltage to the self-holding circuit 108 included in the ECU 100. When the source voltage supplied via the main switch 201 is lower than the predetermined voltage, the power supply hold and power supply cutoff circuit 203 cuts off supply of holding voltage to the self-holding circuit 108.

Figure 9:
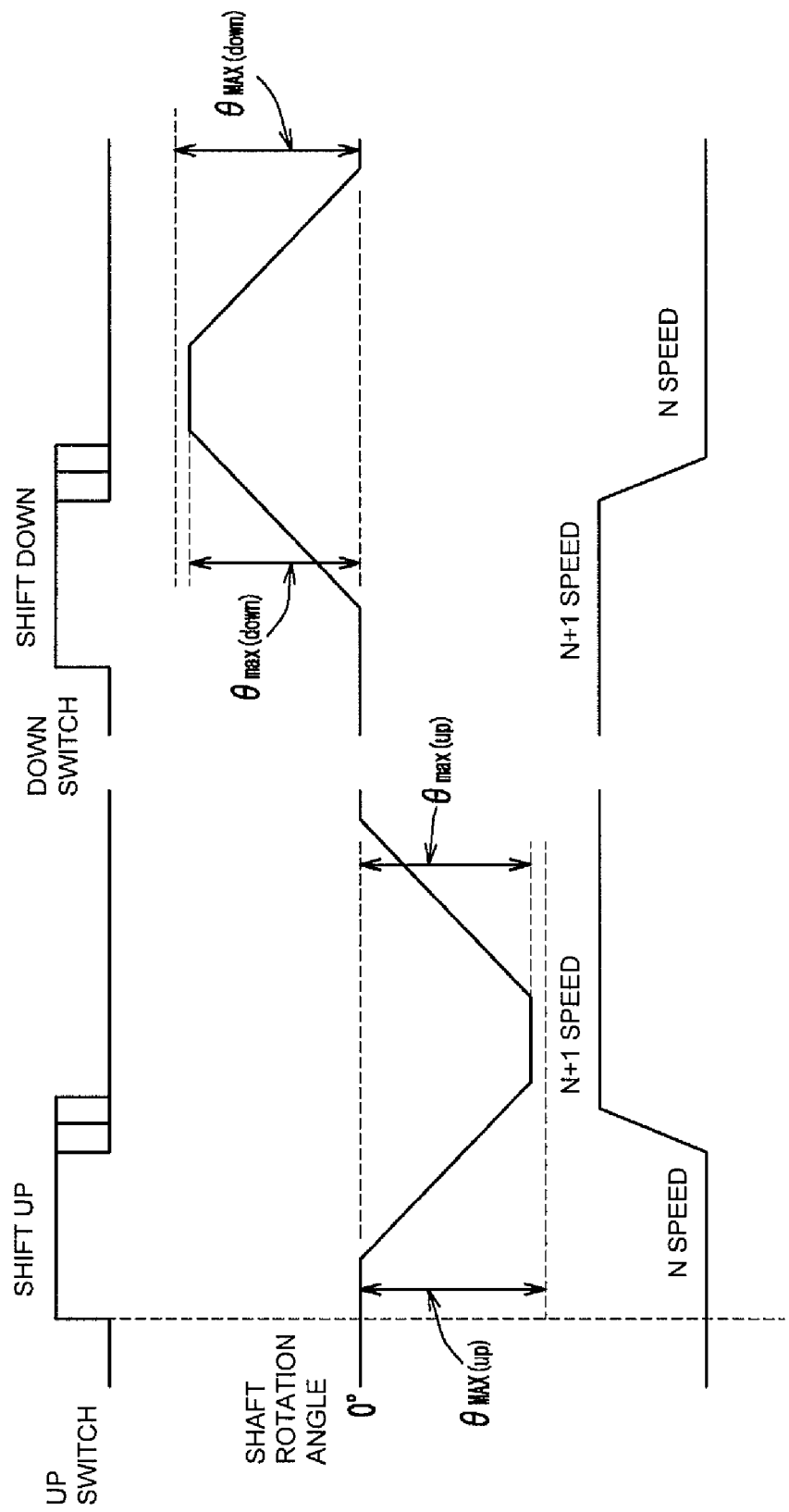
FIG. 9 is a graphical depiction illustrating a shift change operation.

Next, a gearshift operation of the motorcycle 10 will be described. FIG. 9 is an explanatory chart for explaining the gearshift operation. As shown in FIG. 9, when an up-shift operation is made (i.e., the up-shift switch 102a is operated), the shift shaft 70 makes a bidirectional rotational movement in which the shift shaft 70 rotates (reverse rotation) to reach a rotational position $\theta_{max(up)}$ and then returns to a reference angular position (0°). The reference position is stored in a ROM or the like in the ECU 100 in advance. On the other hand, when a down-shift operation is made (the down-shift switch 102b is operated), the shift shaft 70 makes another bidirectional rotational movement in which the shift shaft 70 rotates (normal rotation) to reach a rotational position $\theta_{max(down)}$ and then returns to the reference angular position (0°).

The target positions $\theta_{max\ (up)}$ and $\theta_{max\ (down)}$ are set at the mechanical maximum rotation angles (design values) for reverse rotation and normal rotation, respectively. The mechanical maximum rotation angles are rotational positions of the shift shaft 70 whose rotations in the reverse direction and the normal direction are regulated as discussed above.

However, the target positions $\theta_{max\ (up)}$ and $\theta_{max\ (down)}$ are design values of the mechanical maximum rotation angles. Thus, there is a possibility that the target positions $\theta_{max\ (up)}$ and $\theta_{max\ (down)}$ deviate from the actual mechanical maximum rotation angles for any of the reasons discussed above, including but not limited to tolerance issues or assembly issues in the components of the clutch transfer mechanism 270.

Angles $\theta_{MAX(up)}$ and $\theta_{MAX(down)}$ are examples of the actual mechanical maximum rotation angles of the shift shaft 70 in the reverse rotation and normal rotation. As shown in FIG. 9, the target positions $\theta_{max\ (up)}$ and $\theta_{max\ (down)}$ are different from the actual mechanical maximum rotation angles $\theta_{MAX(up)}$ and $\theta_{MAX\ (down)}$. While the target positions $\theta_{max\ (up)}$ and $\theta_{max\ (down)}$ are smaller than the mechanical maximum rotation angles $\theta_{MAX(up)}$ and $\theta_{MAX(down)}$ in the example in FIG. 9, it is possible that the target positions exceed the mechanical maximum rotation angles. The target position $\theta_{max\ (up)}$ can be either equivalent to or different from the target position $\theta_{max\ (down)}$. Similarly, the actual mechanical maximum rotation angle $\theta_{MAX(up)}$ can be equivalent to or different from the angle $\theta_{MAX(down)}$.

While the shift shaft 70 is rotating back and forth, a series of processes for shift change, including disengagement of the variable speed clutch 37, gear change of the transmission 38, and engagement of the variable speed clutch 37, are performed.

Figure 10:
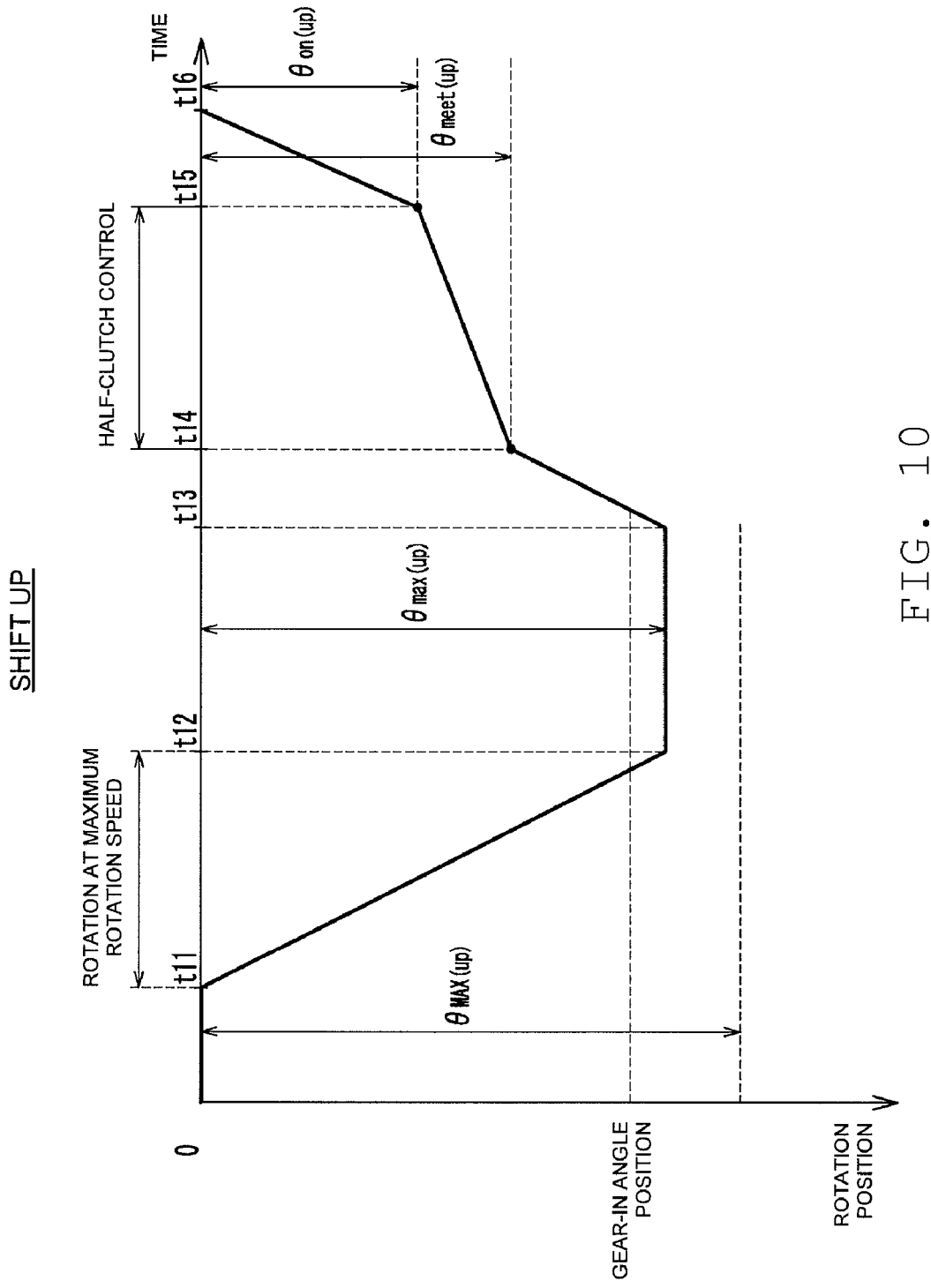
FIG. 10 is a graphical depiction of an up-shift operation.
Figure 11:
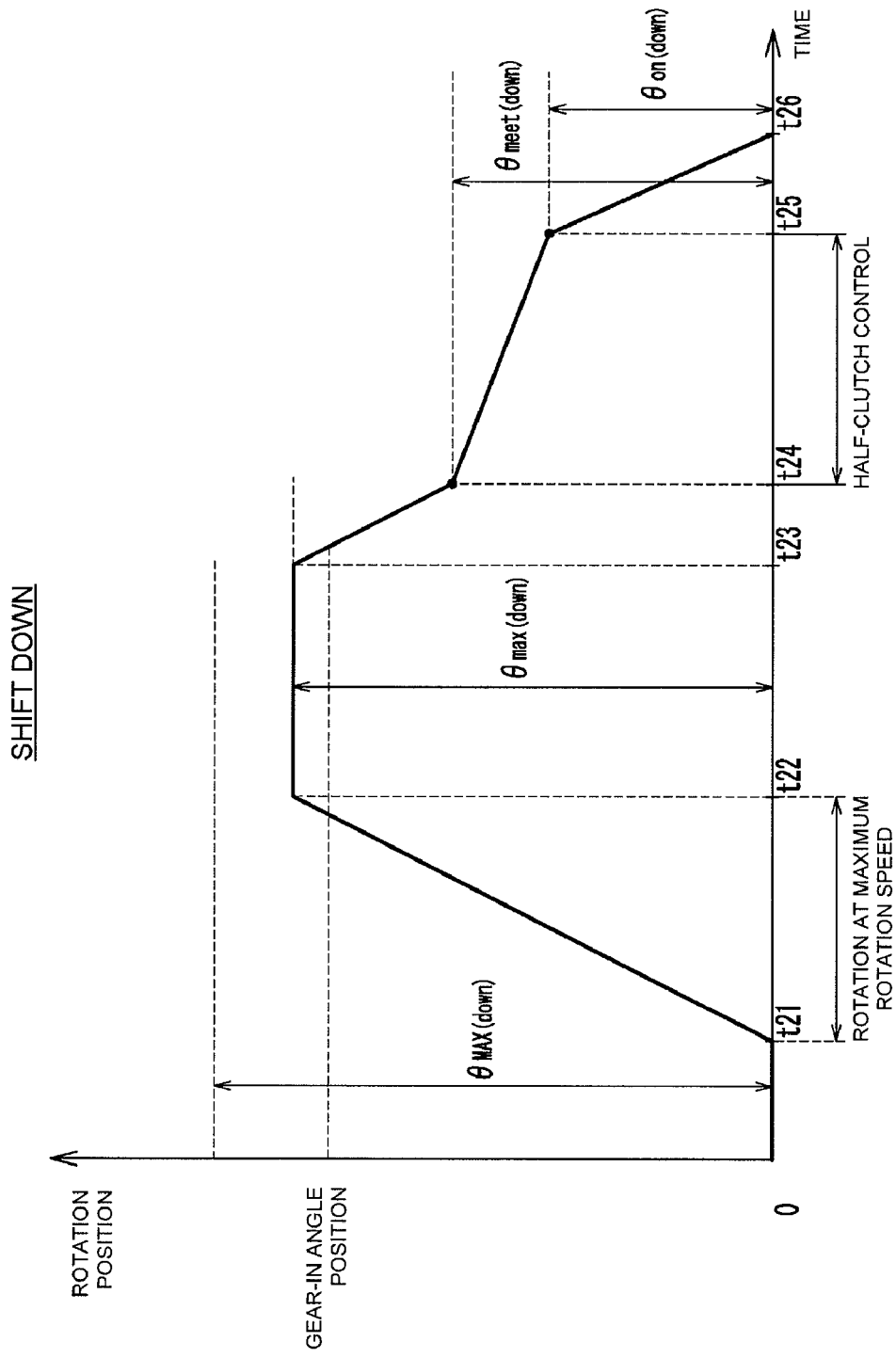
FIG. 11 is a graphical depiction of a down-shift operation.

FIGS. 10 and 11 explain the shift change operation shown in FIG. 9 in more detail. FIG. 10 shows the up-shift case, while FIG. 11 shows the down-shift case.

As illustrated in FIG. 10, when an operation associated with an up-shift is carried out, the shift shaft 70 rotates toward the target position $\theta_{max\ (up)}$ (i.e., a reverse rotation) (see time t11 through t12 in FIG. 10). During this period, the variable speed clutch 37 disengages. In this clutch disengagement step, the shift shaft 70 rotates at the maximum rotational speed.

After the shift shaft 70 reaches the target position $\theta_{max\ (up)}$, the shift shaft 70 rotates toward a target position $\theta_{meet\ (up)}$ in the opposite direction (i.e., a normal rotation) (see time t13 through t14). The target position $\theta_{meet\ (up)}$ is a rotational position of the shift shaft 70 during the period when the disengaged variable speed clutch 37 is shifted to half-clutch condition in the up-shift operation. Preferably, the position $\theta_{meet\ (up)}$ is stored in the ROM or the like of the ECU 100 in advance.

After the rotational position of the shift shaft 70 reaches the position $\theta_{meet\ (up)}$, half-clutch control is executed until the rotational position reaches a target position $\theta_{on\ (up)}$ (see time t14 through t15). The target position $\theta_{on\ (up)}$ is the rotational position of the shift shaft 70 during the period when the half-clutched variable speed clutch 37 is shifted to the engagement condition. Preferably, the position $\theta_{on\ (up)}$ is also stored in the ROM or the like of the ECU 100 in advance. During half-clutch control, the shift shaft 70 rotates at a relatively lower speed. After the rotation angle of the shift shaft 70 reaches the position $\theta_{on\ (up)}$, the shift shaft 70 rotates at the maximum rotational speed until it reaches the reference position (0°) (see time t15 through t16).

In case of down-shift as shown in FIG. 11, the rotation direction of the shift shaft 70 is reversed from the rotation direction in the up-shift case. When down-shift operation is carried out, the shift shaft 70 initially rotates toward the target position $\theta_{max\ (down)}$ (i.e., a normal rotation) (see time t21 through t22). During this period, the variable speed clutch 37 disengages. In this clutch disengagement step, the shift shaft 70 rotates at the maximum rotational speed.

After the shift shaft 70 reaches the target position $\theta_{max\ (down)}$, the shift shaft 70 rotates toward a target position $\theta_{meet\ (down)}$ in the opposite direction (i.e., a reverse rotation) (see time t23 through t24). The target position $\theta_{meet\ (down)}$ is a rotational position of the shift shaft 70 during the period when the disengaged variable speed clutch 37 is shifted to the half-clutch condition in the down-shift operation. Preferably, the position $\theta_{meet\ (down)}$ is stored in the ROM or the like of the ECU 100 in advance (see FIG. 10).

After the rotational position of the shift shaft 70 reaches the position $\theta_{meet\ (down)}$, half-clutch control is executed until the rotational position reaches a target position $\theta_{on\ (down)}$ (see time t24 through t25). The target position $\theta_{on\ (down)}$ is the rotation angle of the shift shaft 70 during the period when the half-clutched variable speed clutch 37 is shifted to the engagement condition. Preferably, the position $\theta_{on\ (down)}$ is stored in the ROM or the like of the ECU 100 in advance (see FIG. 10). After the rotation angle of the shift shaft 70 reaches the position $\theta_{on\ (down)}$, the shift shaft 70 rotates at the maximum rotational speed until the reference position (0°) (see time t25 through t26).

Figure 12:
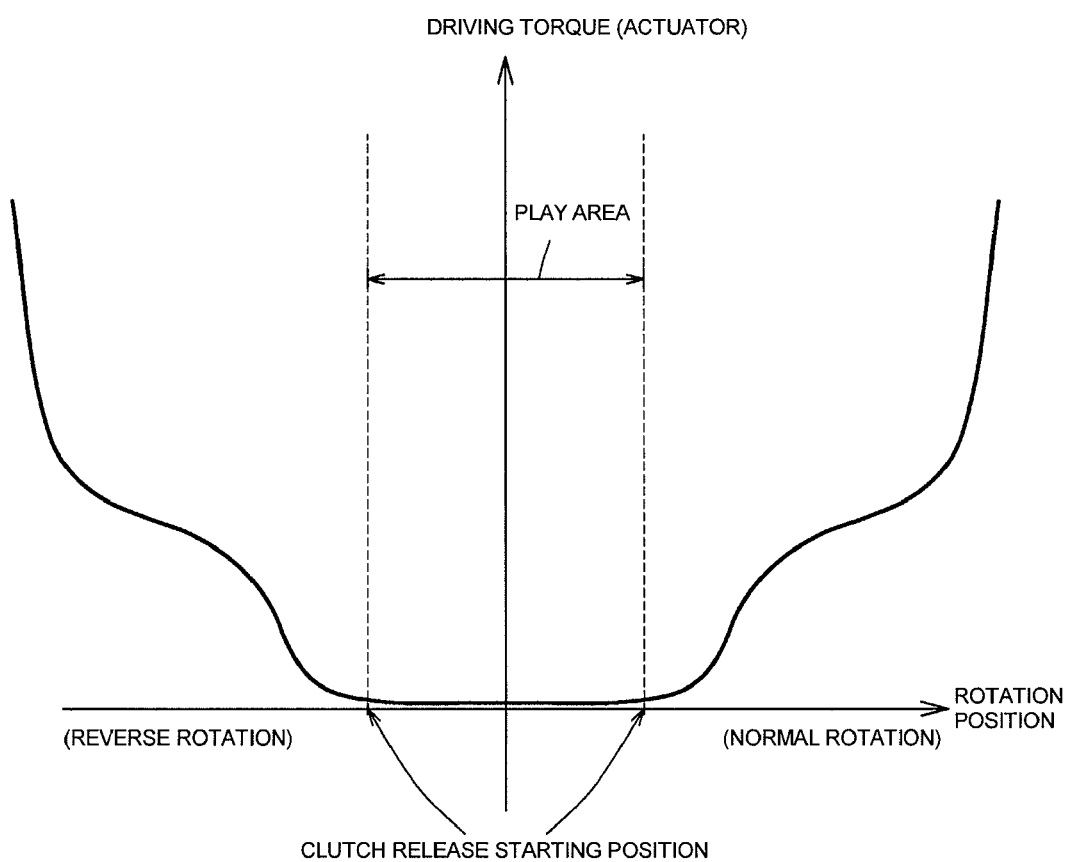
FIG. 12 is a graphical depiction of a relationship between a rotational position of a shift shaft and a driving torque of an actuator.

A play area measurement process for measuring the play area of the shift shaft 70 mentioned above is now explained. FIG. 12 shows the relationship between the rotational position of the shift shaft 70 and the driving torque of the actuator 75 that drives the shift shaft 70. As can be seen from FIG. 12, when the rotational position of the shift shaft 70 lies within the play area, the shift shaft 70 idles and only minimally drives the shift shaft 70 (i.e., the driving torque of the shift shaft 70 is kept at a low value). However, when the rotational position of the shift shaft 70 reaches the position where the clutch transfer mechanism 270 starts operation (hereinafter referred to as clutch release starting position), the driving torque rises from this position. Thus, the driving torque, which is a constant low value when the rotational position of the shift shaft 70 lies within the play area, increases when the rotational position comes out of the play area.

In the play area measurement process, a low level of current is provided to the actuator 75 such that the first cam plate 283 can rotate relative to the second cam plate 284 while not being able to rotate to such a degree that the balls 287 (see FIGS. 6 and 7) go over the inclined portions 286b of the second cam groove 286. When the actuator 75 receives this low level of current, the shift shaft 70 starts to rotate and rotates solely within the play area. Upon reaching the clutch release starting position, the shift shaft 70 stops. In the play area measurement process, the rotational position at which the shift shaft 70 stops rotating is detected by the rotation angle sensor 106, and the play area is measured based on the detected rotational angles.

Figure 13:
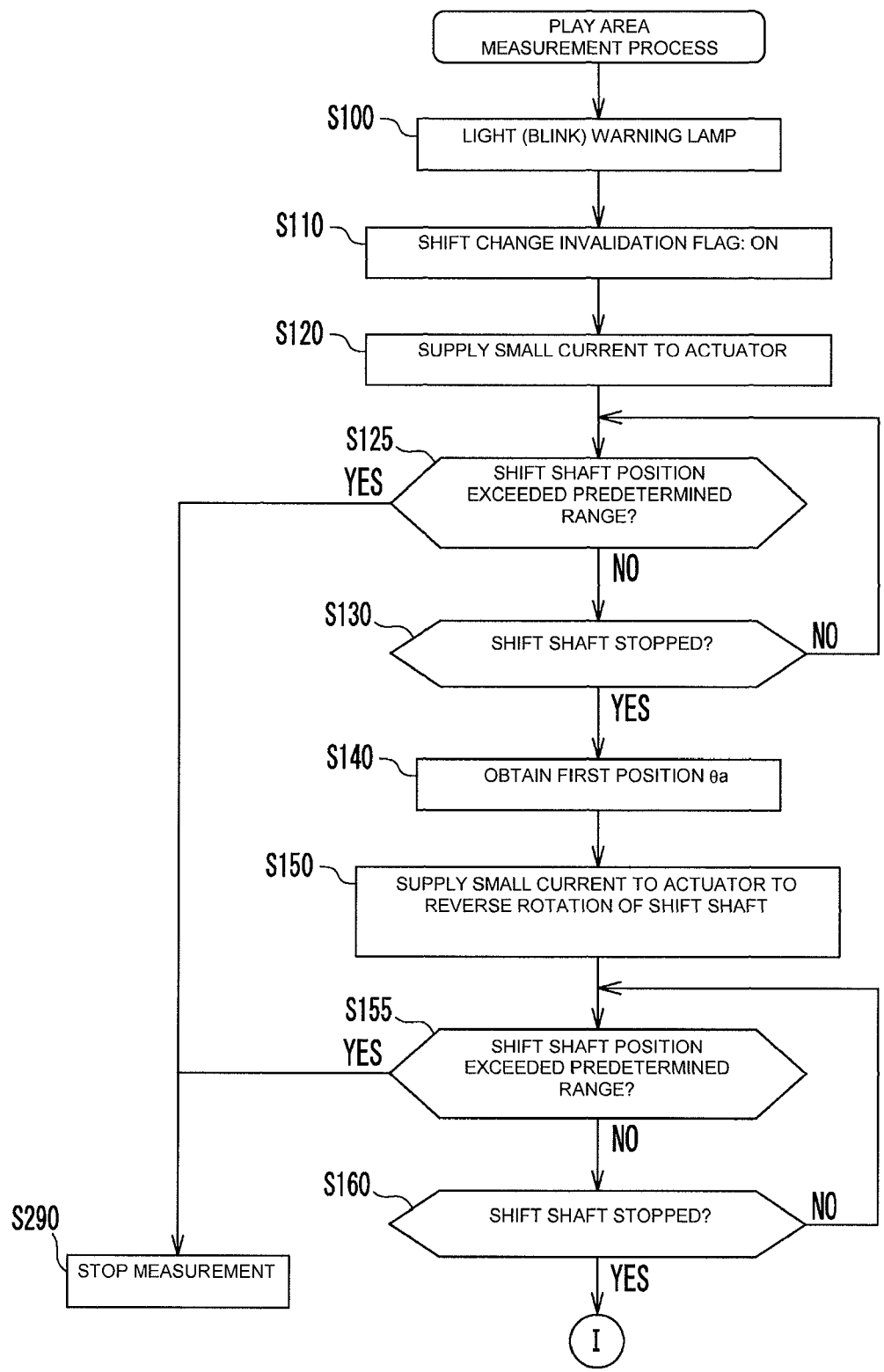
FIG. 13 is a flowchart showing a portion of a play area measurement process.
Figure 14:
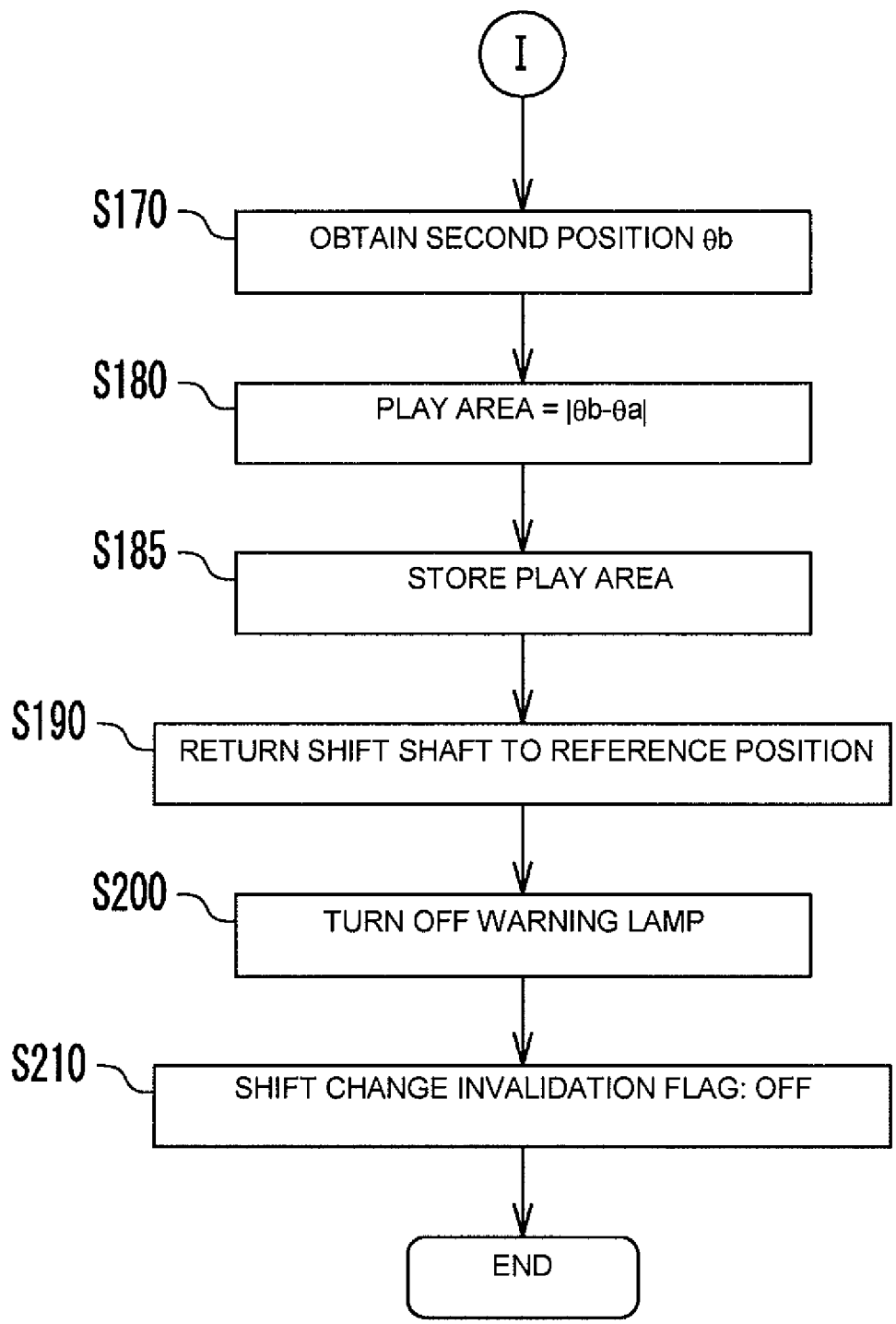
FIG. 14 is a flowchart showing another portion of the play area measurement process.

FIGS. 13 and 14 are flowcharts showing one embodiment of a play area measurement process executed by the ECU 100 of the motorcycle 10. In this embodiment, the play area measurement process is initiated when the main switch 201 is turned on. When the play area measurement process starts, the warning lamp 110 (see FIG. 8) lights up (or blinks). See S100. Turning on (or blinking) of the warning lamp 110 informs an operator or rider that the play area measurement process is being executed.

After execution of the process in S100, a shift change invalidation flag is set to an ON condition. See S110. When the shift change invalidation flag is in the ON condition, the actuator 75 is not actuated even when the shift change operation is requested (e.g., operation of the up-shift switch 102a or the down-shift switch 102b). That is, while the shift change invalidation flag is set to an ON condition, the transmission cannot be shifted even when one of the up-shift and down-shift switches is operated.

Figure 15:
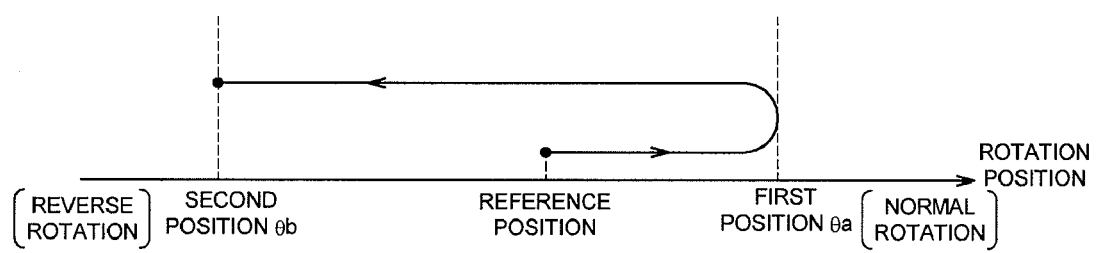
FIG. 15 is a graphical depiction of a rotation operation of the shift shaft.

Next, the low level current mentioned above (i.e., supply of a level of current high enough to cause rotation but low enough to prevent operation of the clutch transfer mechanism 270) is supplied to the actuator 75 to rotate the shift shaft 70 from the reference position in a predetermined direction (either the direction of normal rotation or direction of reverse rotation). See S120. In the following description, it is assumed that the shift shaft 70 is rotated in the normal direction (to the right in FIG. 15) as illustrated in FIG. 15. The shift shaft 70 can be rotated in the reverse rotation.

Then, it is judged whether the rotational position of the shift shaft 70 exceeds a predetermined range. See S125. If the rotational position of the shift shaft 70 exceeds the predetermined range, there is a possibility that the clutch transfer mechanism 270 or some related component is not positioned or operating as anticipated. Thus, the play area measurement routine is stopped. See S290. If it is judged that the rotational position of the shift shaft 70 is within the predetermined range, the shaft is then monitored to see if it has stopped. See S130.

Whether the rotation of the shift shaft 70 has stopped or not can be easily judged by detecting the position of the shift shaft 70 using the rotation angle sensor 106 and checking whether the position has changed after the lapsing of a predetermined time, for example. Because the current supplied to the actuator 75 is a low level current, the shift shaft 70 does not rotate over the clutch release starting position. Thus, the shift shaft 70 stops when it comes to the clutch release starting position. While the shift shaft 70 continues to rotate, the position of the shift shaft 70 is monitored as described above to determine if it exceeds the predetermined range. S125. After the rotation of the shift shaft 70 stops, it is judged that the shift shaft 70 is at the clutch release starting position and this position is acquired as a first position $\theta a$. See S140.

The shift shaft 70 then is rotated in the opposite direction (i.e., reverse rotation in this example, left direction in FIG. 15). See S150. In this case, the low level current mentioned above is again supplied to the actuator 75.

It again is judged whether the rotational position of the shift shaft 70 has exceeded the predetermined range. See S155. If it is determined that the rotational position of the shift shaft 70 exceeds the predetermined range, the play area measurement is stopped. See S290. Otherwise, the shift shaft 70 is monitored to see if it has stopped rotating. See S160. When it is determined that the rotation of the shift shaft 70 has stopped, it is judged that the shift shaft 70 is at the opposite clutch release starting position, and this position is acquired as a second position $\theta b$. See S170.

With the first and second positions $\theta a$, $\theta b$ determined, calculation of the play area is performed. See S180. In this process, the play area is calculated from the first position $\theta a$ obtained in S140 and the second position $\theta b$ obtained in S170. More specifically, the rotation range from $\theta a$ to $\theta b$ is determined as the play area.

The calculated play area is stored in the storage unit 109 (or not-shown ROM or the like), for example. See S185. The stored play area is used for the control of the actuator 75 (e.g., half-clutch control of variable speed clutch 37 or other controls).

The ECU 100 supplies current to the actuator 75 to return the shift shaft 70 to the reference position (0°). See S190. The warning lamp 110 is turned off. See S200. This process notifies the operation of completion of the play area measurement. The shift change invalidation flag is set to the OFF condition. See S210. By setting the shift change invalidation flag to the OFF condition, limitations imposed on various operations during the play area measurement are removed. For example, when the shift change invalidation flag is set at OFF, the actuator 75 can be actuated to carry out shift change in response to execution of the shift change operation. After the process in step S210, the play area measurement process ends.

Various processes can be performed using the play area measured by the above play area measurement process. For example, it can be determined whether an abnormal condition has been caused in the motorcycle 10 based on the measured value of the play area, and an abnormality judgment and notification process for providing a predetermined notification can be performed when it is determined that any abnormality has occurred.

Figure 16:
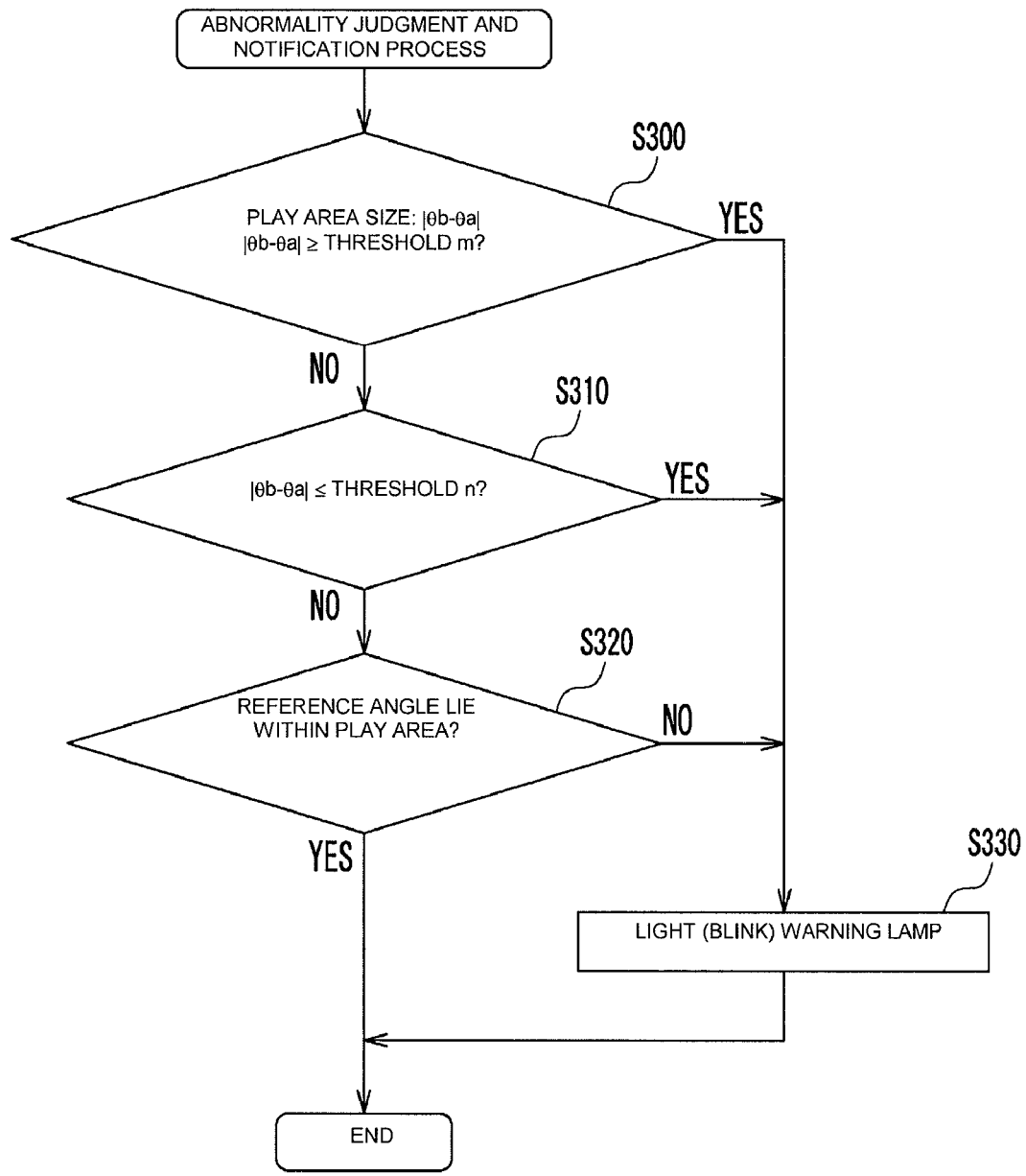
FIG. 16 is a flowchart showing an abnormality judgment and notification process.

FIG. 16 is a flowchart showing one embodiment of the abnormality judgment and notification process that can be executed by the ECU 100 of the motorcycle 10. In this embodiment, the abnormality judgment and notification process is performed in response to completion of the play area measurement process shown in FIGS. 13 and 14.

At the start of the illustrated abnormality judgment and notification process, it is initially judged whether the size of the detected play area is equal to or larger than a predetermined first threshold m. See S300. This process generally judges whether the play area is enlarged to a size larger than a desired size established in advance. The enlargement can occur over time due to long-term use of the motorcycle 10. The size of the play area is defined by |θb−θa| using the second position θb and the first position θa discussed above.

When it is determined that the size of the play area is equal to or larger than the first threshold m, the warning lamp 110 lights up (or blinks). See S330. Thus, an operator can be notified that an abnormal condition has occurred in the motorcycle 10.

When it is determined that the size of the play area does not exceed the first threshold m (i.e., the play area is smaller than first threshold m), it is judged whether the size of the play area |θb−θa| is equal to or smaller than a second threshold value n, which is smaller than the first threshold m. See S310. According to this embodiment, when the play area size |θb−θa| is equal to or smaller than the pre-established second threshold n, it is determined that the size of the play area is inappropriate and that an abnormality has been caused. Thus, when it is determined that the play area size is equal to or smaller than the second threshold n, abnormality notification is provided using the warning lamp 110. See S330.

When it is determined that the play area size is not equal to or smaller than the second threshold n (i.e., it exceeds second threshold n), it is judged whether the reference position (0°) of the shift shaft 70 lies within the range of the play area. See S320. This process judges whether the reference position (0°) stored in advance is present within the range of the play area (from θa to θb) detected by the play area measurement process discussed above. When it is determined that the reference position is not present within the range of the play area, abnormality notification is provided using the warning lamp 110. See S330. When it is determined that the reference position lies within the range of the play area, it is judged that no abnormality exists and the abnormality judgment and notification process ends without executing an abnormality notification.

As described above, the play area measurement process according to the invention is conducted when the main switch 201 is turned on. After the play area measurement process is initiated, the warning lamp 110 lights up, for example (see S100). In this case, the user can easily confirm the start of the play area measurement after turning on the main switch 201. Thus, the user can wait until the play area measurement ends without turning on the ignition switch 125 (see FIG. 8).

However, if the user desires to start operating the vehicle immediately without waiting for completion of the play area measurement, the user turns on the main switch 201 and then immediately turns on the ignition switch 125. When the ignition switch 125 is turned on to start the engine 29 during measurement of the play area, the play area may not be accurately measured in some cases. Thus, the following process can be carried out.

Figure 17:
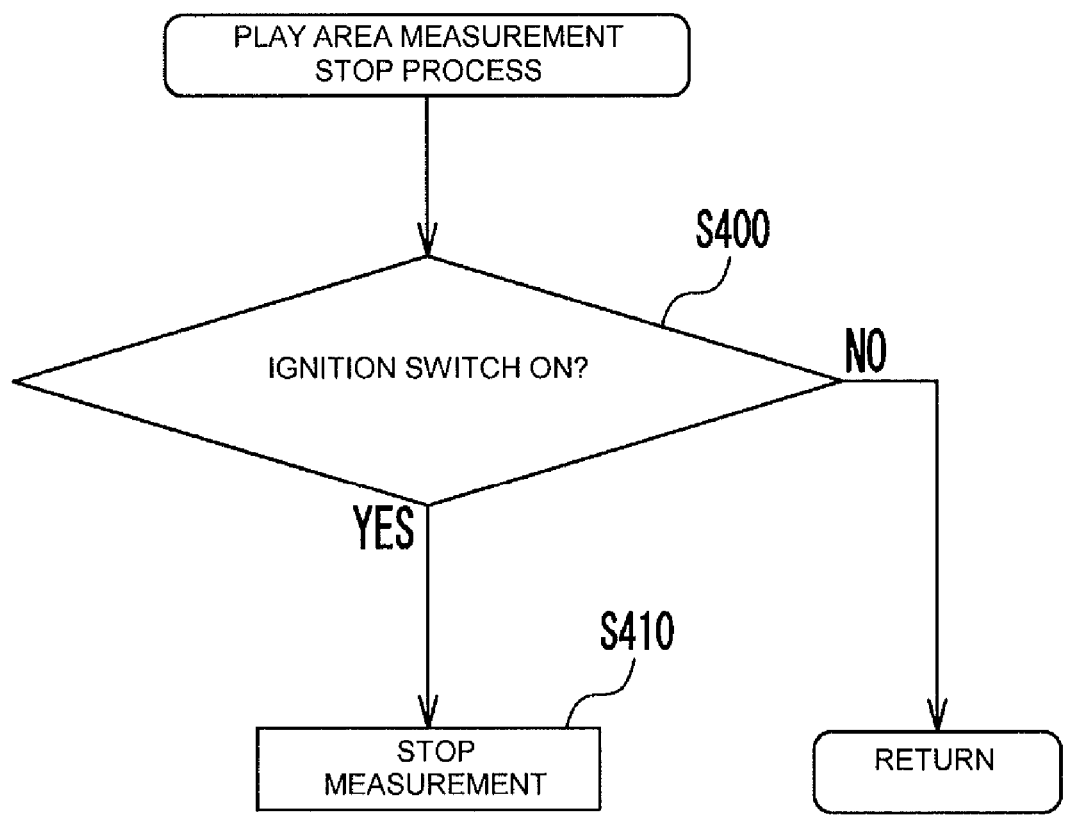
FIG. 17 is a flowchart showing a play area measurement stop process.

When the play area measurement is initiated as shown in FIG. 17, it is judged whether the ignition switch 125 is turned on before completion of the measurement (e.g., S400), for example. When it is determined that the ignition switch 125 has been turned on, the measurement is stopped. See S410. When it is determined that the ignition switch 125 is not turned on, the play area measurement continues. This play area measurement stop process can be repeatedly executed at predetermined time intervals, for example.

In the above example, the play area measurement process is performed when the engine is stopped. It is possible, however, to conduct the play area measurement process while the engine 29 is operating. When the play area measurement process is executed during operation of the engine 29, it is preferable to carry out the following process shown in FIG. 18 so as to increase the measurement accuracy. Other processes also can be used in addition to, or in place of, the process of FIG. 18.

First, it is judged whether the number of engine revolutions (i.e., engine speed) is equal to or smaller than a predetermined value. See S500. When it is determined that the number of engine revolutions (i.e., engine speed) exceeds the predetermined value, accurate measurement is difficult due to high engine speed. Thus, the play area measurement is stopped. S510.

When it is determined that the number of engine revolutions (i.e., engine speed) is equal to or smaller than the predetermined value, it is judged whether the variation of engine revolutions is equal to or larger than a predetermined value. See S520. The variation of engine revolutions can be the difference between the maximum or minimum value of the detected engine revolutions (i.e., the detected engine speed) and that value during the play area measurement, for example. Alternatively, the variation can be the difference between detected engine revolutions (i.e., the detected engine speed) and the engine speed at the start of the play area measurement. When it is determined that the variation of engine revolutions is equal to or larger than the predetermined value, the play area measurement is stopped because operation of the motorcycle 10 is unstable. See S530. When it is determined that the variation of engine revolutions (i.e., engine speed) is smaller than the predetermined value, the play area measurement continues. See S540.

After the measurement is stopped (see S530), the variation of engine revolutions is checked to see if it is equal to or larger than the predetermined value. See S550. Once it is determined that the variation of engine revolutions (i.e., the variation in engine speed) has become smaller than the predetermined value, the play area measurement is restarted. See S560.

It is possible to carry out a process for reducing the output of the engine 29 during measurement of the play area. For example, the output of the engine 29 can be reduced by transmitting the ignition cut signal from the ECU 100 (ignition control unit) to the CDI 105 (ignition unit) during the play area measurement. This process stabilizes the play area measurement.

As discussed above (see FIG. 11), according to the above example, the shift shaft 70 rotates at a low speed from the time when the rotational position of the shift shaft 70 reaches the target position $\theta_{meet\ (down)}$, through the time when the variable speed clutch 37 is in the half-clutch condition, until the rotational position of the shift shaft 70 reaches the subsequent target position $\theta_{on\ (down)}$ in the engagement step of the variable speed clutch 37. That is, the ECU 100 executes half-clutch control for this period. In this process, it is possible to shift at least either the target position $\theta_{meet\ (down)}$ (hereinafter referred to as first target position) or $\theta_{on\ (down)}$ (hereinafter referred to as second target position) toward the clutch engagement side (see arrow 2 in FIG. 20) or the clutch disengagement side (see arrow 1 in FIG. 20) according to the size of the play area as illustrated in FIGS. 19 and 20.

Figure 19:
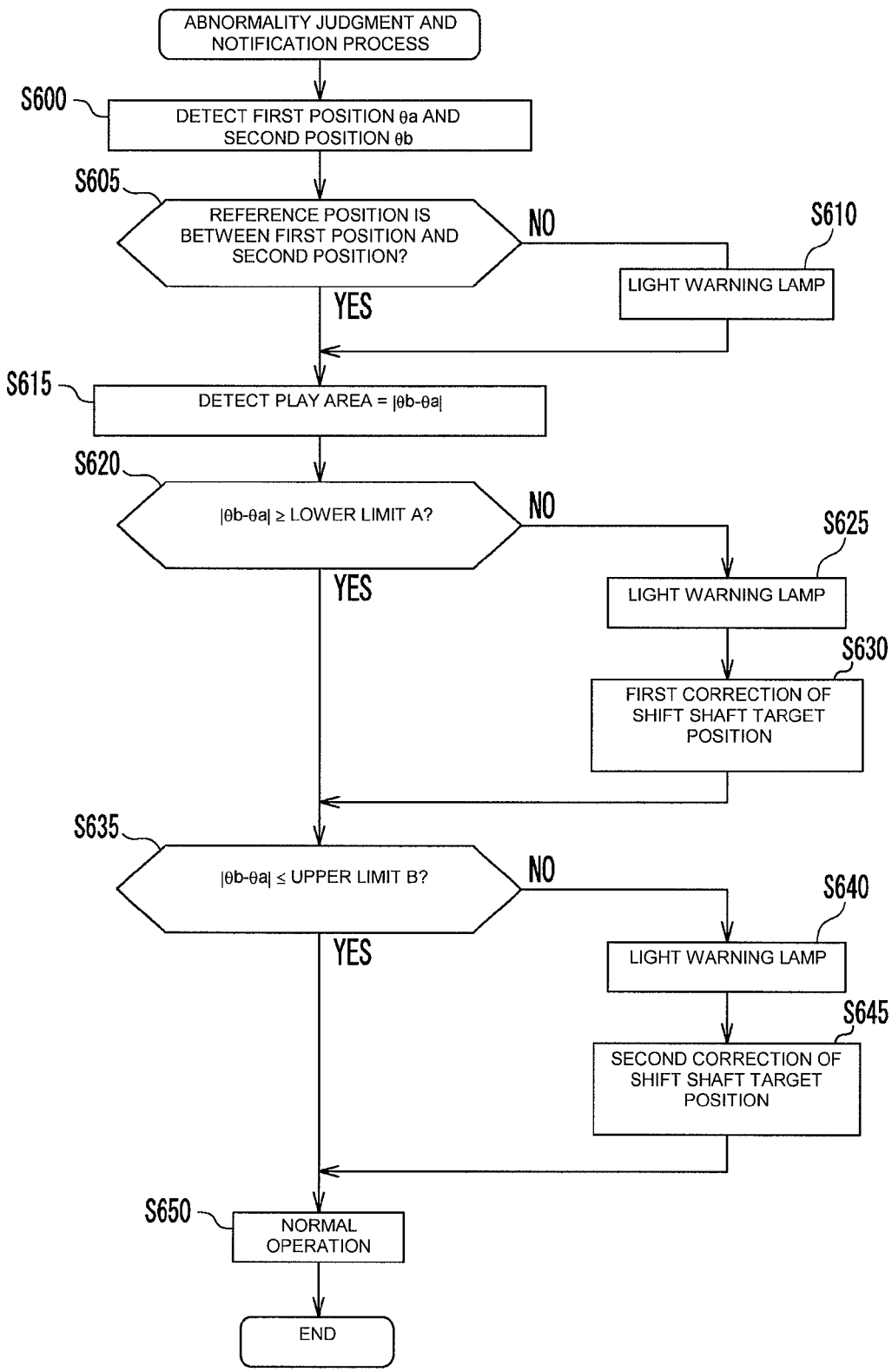
FIG. 19 is a flowchart showing another abnormality judgment and notification process.
Figure 20:
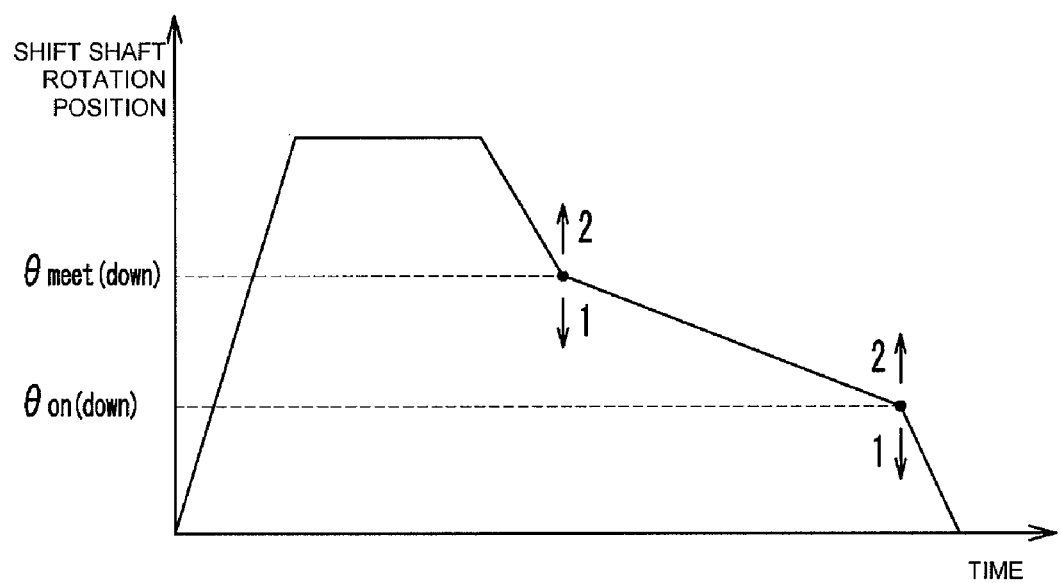
FIG. 20 is a graphical depiction of a first correction in step S630 and a second correction in step S645 shown in FIG. 19.

According to the process shown in FIG. 19, the first position $\theta a$ and the second position $\theta b$ are initially detected. See S600. Then, it is judged whether the reference position (0°) lies within the range between the first position $\theta a$ and the second position $\theta b$. See S605.

When the judgment result is NO, the warning lamp is turned on. See S610. When the judgment result is YES, it is determined that the reference position lies within the appropriate range. Regardless of the whether or not the reference position lies within the range, the play area size (width)=$|\theta b - \theta a|$ then is calculated. See S615.

It then is judged whether the play area width is equal to or larger than a predetermined lower limit A. See S620. When it is determined that the play area width is smaller than the lower limit A, the warning lamp is turned on (see S625) and a first correction for the target position (at least either first target position $\theta_{meet\ (down)}$ or second target position $\theta_{on\ (down)}$) of the shift shaft 70 is performed (see S630). The first correction shifts the target position of the shift shaft 70 toward the clutch engagement side as indicated by the arrow 1 in FIG. 20. By the first correction, the half clutch range is corrected to shift toward the engagement side of the variable speed clutch 37. As a result, shift change can be appropriately achieved even when the play area width is smaller than the predetermined lower limit A.

Once the correction has taken place or once it is determined that the range is greater than or equal to the lower limit A, it is judged whether the play area width is equal to or smaller than a predetermined upper limit B. See S635. When the play area width is equal to or smaller than the upper limit B, it is determined that the play area width lies within the appropriate range. Thus, normal operation resumes. See S650.

When it is determined that the play area width is larger than the upper limit B, the warning lamp is turned on (see S640) and a second correction for the target position (at least either first target position $\theta_{meet\ (down)}$ or second target position $\theta_{on\ (down)}$) of the shift shaft 70 is performed (see S645). The second correction shifts the target position of the shift shaft 70 toward the clutch disengagement side as indicated by the arrow 2 in FIG. 20. By the second correction, the half clutch range is corrected to shift toward the disengagement side of the variable speed clutch 37. As a result, shift change can be appropriately achieved even when the play area width is larger than the predetermined upper limit B.

As explained above, the motorcycle 10 according to this embodiment has a transmission controller 300 (see FIG. 8) that controls engagement and disengagement of the variable speed clutch 37 and speed change operation of the transmission 38. The transmission controller 300 has a play area measurement system that measures the play area of the shift shaft 70 (see S120 through S180 in FIGS. 13 and 14). In this case, the accurate play area of the shift shaft 70 is detectable, and thus shift change can be accurately executed even with variation from vehicle to vehicle. In addition, accurate shift change even over long-term use can be obtained.

In one configuration, the play area measurement system is executed by S120 through S180 shown in FIGS. 13 and 14 as software. In some embodiments, the play area measurement system can be provided as hardware. That is, the transmission controller 300 can include a play area measuring unit.

In some embodiments, the play area measurement supplies a low level current to such an extent that the clutch transfer mechanism 270 is not operated during the play area measurement so that the shift shaft 70 rotates (idles). Then, the play area measurement system detects the rotational position of the shift shaft 70 when the rotation stops, and the play area measurement system calculates the play area based on this rotational position. According to this embodiment, therefore, the shift shaft 70 is actually rotated, and thereafter the condition that the shift shaft 70 has reached the clutch release starting position is detected. Then, the play area is calculated based on the detection. Thus, the play area can be accurately measured.

In some embodiments, the shift shaft 70 is rotated in both directions, and then the play area is calculated based on the rotational positions (first position $\theta a$ and second position $\theta b$) at the time rotation stops in both the directions during the play area measurement. Since the shift shaft is operated multiple times, enhanced detection of the play area can be attained.

As discussed above, a low level current is supplied to the actuator 75 and the shift shaft 70 is rotated until rotation stops during the play area measurement. However, there is a possibility that the shift shaft 70 may excessively rotate over the play area even when small current is supplied to the actuator 75 due to degradation of the clutch transfer mechanism 270 over time or due to other causes, for example. In the illustrated embodiment, however, the play area measurement stops when the rotational position of the shift shaft 70 exceeds the predetermined range during the play area measurement (see S290). Thus, excessive rotation of the shift shaft 70 during the play area measurement can be avoided.

The clutch transfer mechanism 270 in one embodiment is a ball-type cam mechanism in which the first cam plate 283 and the second cam plate 284 are opposed to each other. The cam groove 286 of the second cam plate 284 has the extensions 286c extending in the moving direction of the balls 287. These extensions 286c produce an area which maintains a generally constant distance between both the cam plates 283 and 284 even when the balls 287 slightly shift under the influence of the rotation of the shift shaft 70. This area corresponds to the play area of the shift shaft 70. Therefore, the play area of the shift shaft 70 can be provided by the relatively simple structure.

In one embodiment, notification is provided using the warning lamp 110 (see S330) when the measured play area is equal to or larger than the predetermined upper limit (see S300) or equal to or lower than the predetermined lower limit (see S310). Thus, the user can be promptly and securely notified about the fact that the play area is excessively large or small.

When the reference position of the shift shaft 70 is considerably shifted, shifting of the transmission may not be performed in a desired manner. According to one embodiment, however, whether the reference position of the shift shaft 70 stored in advance lies within the range of the play area is determined (see S320). When it is determined that the reference position is not within the range of the play area, notification is given using the warning lamp 110 (see S330). Thus, the user can be promptly notified about the abnormal condition of the motorcycle 10 caused by deviation of the reference position of the shift shaft 70.

According to the transmission controller 300 in one embodiment, the warning lamp 110 lights (or blinks) during the play area measurement (see S100). Thus, the user can easily recognize that the play area measurement is being carried out.

In one embodiment, the warning lamp 110 is used as a warning unit for notifying that the play area measurement is being performed or to alert a user as to other conditions.

However, the warning unit is not limited to the warning lamp 110, but can be other units. The warning unit can give any warning perceivable by the five senses of humans other than the sense of sight. For example, the warning unit can be a unit generating sounds (such as buzzer), a unit generating vibration, or other units.

According to one embodiment, notification is given using the warning lamp 110 when the size of the play area is equal to or larger than the predetermined range, when the reference position of the shift shaft 70 is not present within the range of the play area, and/or when the play area measurement is being conducted. Obviously, a different and/or dedicated warning unit can be used for one or more of these situations.

In the illustrated embodiment, the shift operation is not executed during the play area measurement even when a shift command is issued. Thus, malfunction of the shift operation is less likely to occur.

Figure 18:
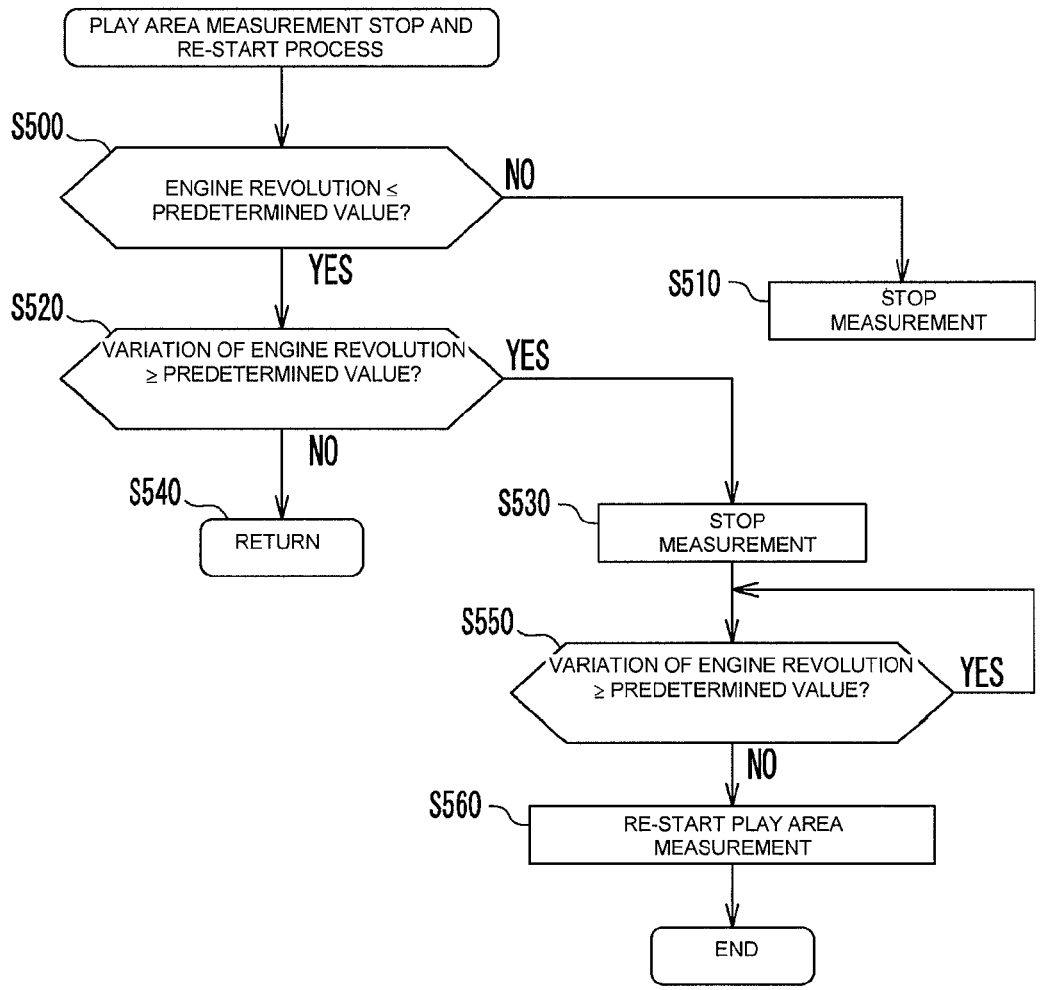
FIG. 18 is a flowchart showing a play area measurement stop and re-start process.

In one embodiment, the play area measurement stops when the number of engine revolutions (i.e., the engine speed) exceeds the predetermined value (see S510 in FIG. 18). That is, the play area measurement is carried out when the engine speed is equal to or smaller than the predetermined value. Thus, the play area measurement can be more accurately performed, and reliability of the measurement results can be enhanced.

In one embodiment, the play area measurement stops when the variance of engine speed from the start of the play area measurement exceeds the predetermined amount (see S530). Thus, the reliability of the measurement results of the play area measurement can be further increased. It is possible to temporarily complete the play area measurement and then stop storing the measurement results in the storage unit 109 instead of stopping the play area measurement.

In one embodiment, when the engine speed variation becomes smaller than the predetermined value after the play area measurement has been suspended due to engine speed variations equal to or larger than the predetermined value, the play area measurement re-starts (see S560). Thus, the play area measurement automatically starts without requiring a user's commands for each operation. Accordingly, usability increases.

According to one embodiment, the play area measurement stops when the engine starting unit (e.g., the ignition switch 125) is turned on after the start of the play area measurement. Thus, the user need not wait to start the engine 29 until completion of the play area measurement, and can start the engine 29 immediately. Thus, usability improves. In addition, errors of the play area measurement can be avoided.

In one embodiment, the play area measurement is performed when the main switch 102 is switched from OFF to ON. Thus, it is unlikely that execution of the play area measurement will be forgotten for a long period, unlike the case where the user must give an affirmative commands to execute play area measurement. Thus, the play area measurement can be performed at regular intervals. Accordingly, the accurate play area can be constantly detected even after long-term use, and shift change can be accurately achieved at all times.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A transmission controller comprising an actuator adapted to generate a driving force, a shift shaft drivingly coupled to the actuator, the shift shaft being rotatable in a normal direction and a reverse direction, a clutch transfer mechanism being connected to the shift shaft, the clutch transfer mechanism being coupled to a clutch, the clutch transfer mechanism being adapted to engage and disengage the clutch in accordance with rotation of the shift shaft, a transmission transfer mechanism also connected to the shift shaft, the transmission transfer mechanism adapted to change a transmission gear ratio in accordance with rotation of the shift shaft, and a play area measurement system adapted to measure a play area of the shift shaft in which rotation of the shift shaft does not result in actuation of the clutch transfer mechanism.

2. The transmission controller according to claim 1 further comprising a position sensor configured to detect the rotational position of the shift shaft, the clutch transfer mechanism being adapted to operate only when driving force equal to or larger than a predetermined value is applied to the shift shaft and wherein the play area measurement system rotates the shift shaft by supplying a low level electrical current to such an extent that the clutch transfer mechanism does not cause operation of the clutch and detects the rotational position of the shift shaft when the shift shaft is not rotating by using the position sensor.

3. The transmission controller according to claim 1, further comprising a control unit that executes a half-clutch control to decrease the rotational speed of the shift shaft when the rotational position of the shift shaft reaches a first target position and to increase the rotational speed of the shift shaft when the rotational position of the shift shaft reaches a second target position located closer to the clutch engagement side than the first target position in an engagement step of the clutch during shift change, the control unit correcting the first target position or the second target position toward the clutch engagement side when the size of the play area is smaller than a predetermined lower limit, and the control unit correcting the first target position or the second target position toward the clutch disengagement side when the size of the play area is larger than a predetermined upper limit.

4. The transmission controller according to claim 1, wherein the play area measurement system stops play area measurement when the rotational position of the shift shaft exceeds a predetermined range during the play area measurement.

5. The transmission controller according to claim 1, wherein the clutch transfer mechanism comprises a first cam plate comprising a first cam groove and rotating with the shift shaft, a second cam plate comprising a second cam groove, the second cam plate being opposed to the first cam plate such that the second cam plate can freely move toward and away from the first cam plate and a ball disposed within the first and second cam grooves and sandwiched between the first and second cam plates, the clutch transfer mechanism achieving engagement and disengagement of the clutch through the movement of at least one of the cam plates toward and away from another of the cam plates caused by movement of the ball into and out of both the cam grooves in accordance with rotation of the shift shaft, at least a part of the play area being defined by an extension provided on either the first or the second cam groove and extending in the shift direction of the ball.

6. The transmission controller according to claim 1 further comprising a notifying unit configured to provide notification when a size of the play area measured by the play area measurement system is equal to or larger than a predetermined upper limit or equal to or smaller than a predetermined lower limit.

7. The transmission controller according to claim 1 further comprising a judging unit configured to judge whether a reference position of the shift shaft stored in advance lies within the play area measured by the play area measurement system and a notifying unit configured to provide notification based on judgment of the judging unit that the reference position of the shift shaft is not within the play area.

8. The transmission controller according to claim 1 further comprising a notifying unit configured to provide predetermined notification during the play area measurement.

9. The transmission controller according to claim 8, wherein the notifying unit comprises a warning lamp.

10. The transmission controller according to claim 1, wherein the actuator does not operate during play area measurement even when the actuator receives a shift command for starting operation of the actuator.

11. The transmission controller according to claim 1 further comprising an engine revolution detecting unit configured to detect a number of engine revolutions over a period of time, the play area measurement system executing the play area measurement when the number of engine revolutions detected by the engine revolution detecting unit is equal to or smaller than a predetermined value.

12. The transmission controller according to claim 1 further comprising an engine revolution detecting unit that detects the number of engine revolutions over a period of time and the play area measurement system stops play area measurement when a variation in engine revolutions from start until the end of the play area measurement is equal to or larger than a predetermined value.

13. The transmission controller according to claim 12, wherein the play area measurement system re-starts the play area measurement when the variation of engine revolutions becomes a value smaller than a predetermined value after the play area measurement has been stopped.

14. The transmission controller according to claim 1 further comprising an engine starting unit, the play area measurement system stopping any play area measurement that is ongoing when the engine starting unit is operated.

15. The transmission controller according to claim 1 further comprising an engine ignition unit and an ignition control unit that controls the ignition unit, the ignition control unit controlling the ignition unit such that output of the engine is reduced during the play area measurement.

16. The transmission controller according to claim 1 further comprising a power source that supplies electric power and a main switch that controls power supply from the power source, the play area measurement system initiating play area measurement when the main switch changes from OFF to ON.

17. A transmission controller, comprising:
a clutch;
a transmission;
an actuator configured to generate driving force;
a shift shaft configured to rotate in normal and reverse directions with the driving force of the actuator;
a clutch transfer mechanism configured to achieve engagement and disengagement of the clutch in accordance with rotation of the shift shaft when driving force of at least a predetermined value is applied to the shift shaft;
a transmission transfer mechanism configured to achieve speed change operation of the transmission in accordance with rotation of the shift shaft;
a position sensor configured to detect a rotational position of the shift shaft;
a measuring unit configured to rotate the shift shaft alternately in normal and reverse directions by supplying a level of electrical current which is large enough to rotate the shift shaft but small enough to avoid actuation of the clutch transfer mechanism, the measuring unit detecting a first position as a rotational position of the shift shaft when the rotation of the shift shaft in either the normal or reverse direction stops and a second position as a rotational position of the shift shaft when the rotation of the shift shaft in the opposite direction stops using the position sensor.

18. The transmission controller according to claim 17 further comprising an engine revolution detecting unit that detects the number of engine revolutions in a period of time, the measurement unit stopping detection when a variation of engine revolutions during measurement is equal to or larger than a predetermined value.

19. The transmission controller according to claim 18, wherein the measurement unit re-starts measurement when the variation of engine revolutions becomes a value smaller than a predetermined value after measurement has been stopped.

20. The transmission controller according to claim 17 further comprising an engine starting unit, the measurement unit stopping measurement when the engine starting unit is operated.

21. The transmission controller according to claim 17 further comprising an engine ignition unit and an ignition control unit that controls the ignition unit, the ignition control unit controlling the ignition unit such that output of the engine is reduced during measurement by the measurement unit.

22. The transmission controller according to claim 17 further comprising a power source that supplies electric power and a main switch connected to the power source, the measurement unit initiating measurement when the main switch changes from OFF to ON.

23. A vehicle that includes the transmission controller according to claim 17.

24. The vehicle of claim 23, wherein the vehicle comprises a straddle-type vehicle.

25. A method of controlling a transmission, the transmission comprising a shift shaft that is rotated by an actuator, the shift shaft having a rotational region defining a play area, the method comprising detecting a first boundary of the play area, detecting a second boundary of the play area, and adjusting at least one of the first boundary and the second boundary based upon whether a rotational angle between the first boundary and the second boundary is larger than a first predetermined value and whether the rotational angle is smaller than a second predetermined valve.

\* \* \* \* \*